(12) United States Patent
Chandrashekaran et al.

(10) Patent No.: US 10,921,035 B2
(45) Date of Patent: Feb. 16, 2021

(54) CLEAR ICE MAKING APPLIANCE AND METHOD OF SAME

(71) Applicant: Whirlpool Corporation, Benton Harbor, MI (US)

(72) Inventors: Arivazhagan Chandrashekaran, Issaquah, WA (US); Andrew M. Tenbarge, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/093,395

(22) PCT Filed: Apr. 13, 2017

(86) PCT No.: PCT/US2017/027380
§ 371 (c)(1),
(2) Date: Oct. 12, 2018

(87) PCT Pub. No.: WO2017/180848
PCT Pub. Date: Oct. 19, 2017

(65) Prior Publication Data
US 2019/0128584 A1    May 2, 2019

Related U.S. Application Data

(60) Provisional application No. 62/322,157, filed on Apr. 13, 2016.

(51) Int. Cl.
*F25C 1/20* (2006.01)
*F25D 23/04* (2006.01)
(Continued)

(52) U.S. Cl.
CPC ............... *F25C 1/20* (2013.01); *F25C 1/10* (2013.01); *F25C 1/24* (2013.01); *F25C 5/06* (2013.01);
(Continued)

(58) Field of Classification Search
CPC ........ F25C 1/10; F25C 1/18; F25C 1/20; F25C 1/24
See application file for complete search history.

(56) References Cited

U.S. PATENT DOCUMENTS 3,053,059 A * 9/1962 Voigtmann ............... F25C 1/24
62/344
3,318,105 A * 5/1967 Burroughs ............... F25C 1/18
62/71

(Continued)

FOREIGN PATENT DOCUMENTS

EP     2743609 A2    6/2014
EP     2784415 A2    10/2014
(Continued)

OTHER PUBLICATIONS

European Patent Office, "Extended European Search Report and Written Opinion," issued in connection with Application No. 17783120.3, dated Oct. 15, 2019, 6 pages.
(Continued)

*Primary Examiner* — Christopher R Zerphey
(74) *Attorney, Agent, or Firm* — Nyemaster Goode, P.C.

(57) ABSTRACT

An aspect of the present disclosure is generally directed to an ice making appliance that includes: an ice making compartment and an ice maker including an ice mold having a total water capacity. The ice mold includes a plurality of ice wells and is configured to release the ice cubes without the use of a heater and by twisting the ice mold. The ice wells are typically no more than about 12.2 mm in depth from a top surface of the ice mold and have a volume of about 20 mL or less. The ice maker is capable of producing at least about 3.5 lbs. of ice or more in a 24 hour span.

14 Claims, 18 Drawing Sheets

(51) Int. Cl.
    *F25C 5/20*           (2018.01)
    *F25C 1/10*           (2006.01)
    *F25C 1/24*           (2018.01)
    *F25C 5/06*           (2006.01)
    *F25C 5/08*           (2006.01)
    *F25D 11/02*         (2006.01)

(52) U.S. Cl.
    CPC ............... *F25C 5/08* (2013.01); *F25C 5/22* (2018.01); *F25D 11/02* (2013.01); *F25D 23/04* (2013.01); *F25C 2305/022* (2013.01); *F25C 2400/10* (2013.01); *F25C 2500/06* (2013.01); *F25C 2700/12* (2013.01); *Y02P 60/85* (2015.11)

(56) References Cited

U.S. PATENT DOCUMENTS

| | | | |
|---|---|---|---|
| 3,620,497 | A | 11/1971 | Schaff |
| 3,952,539 | A | 4/1976 | Hanson et al. |
| 4,424,683 | A | 1/1984 | Manson |
| 5,025,637 | A | 6/1991 | Hara |
| 5,182,916 | A | 2/1993 | Oike et al. |
| 5,187,948 | A * | 2/1993 | Frohbieter ............ F25C 1/08 62/351 |
| 5,393,032 | A | 2/1995 | Cederroth |
| 5,455,382 | A | 10/1995 | Kojima |
| 5,582,754 | A * | 12/1996 | Smith ................ F25C 1/24 219/386 |
| 6,820,433 | B2 | 11/2004 | Hwang |
| 6,857,277 | B2 * | 2/2005 | Somura ............... F25C 1/18 249/92 |
| 6,935,124 | B2 * | 8/2005 | Takahashi ............ F25C 1/18 62/347 |
| 7,010,934 | B2 * | 3/2006 | Choi .................. F25C 1/10 249/127 |
| 7,437,885 | B2 | 10/2008 | Wu et al. |
| 7,549,297 | B2 | 6/2009 | Martin et al. |
| 7,628,030 | B2 | 12/2009 | Visin et al. |
| 7,628,031 | B2 | 12/2009 | Visin et al. |
| 7,762,092 | B2 * | 7/2010 | Tikhonov ............ F25C 1/04 62/186 |
| 7,841,191 | B2 | 11/2010 | Visin et al. |
| 7,849,707 | B2 | 12/2010 | Wu |
| 7,891,207 | B2 | 2/2011 | Visin et al. |
| 7,913,510 | B2 | 3/2011 | Visin et al. |
| 7,913,514 | B2 | 3/2011 | Visin et al. |
| 7,946,125 | B2 | 5/2011 | Visin et al. |
| 8,096,142 | B2 | 1/2012 | Visin et al. |
| 8,371,133 | B2 * | 2/2013 | Kim .................. F25C 1/18 62/351 |
| 8,402,783 | B2 | 3/2013 | Kim et al. |
| 8,539,780 | B2 * | 9/2013 | Herrera ............... F25C 5/08 62/238.5 |
| 8,794,025 | B2 * | 8/2014 | Rugeris ............... F25C 1/18 62/1 |
| 8,844,313 | B2 | 9/2014 | DeVos |
| 9,291,381 | B2 * | 3/2016 | Nelson ............... F25C 1/00 |
| 9,310,115 | B2 * | 4/2016 | Boarman ............ F25C 1/24 |
| 9,410,723 | B2 * | 8/2016 | Boarman ............ F25B 21/02 |
| 9,500,398 | B2 * | 11/2016 | Boarman ............ F25C 1/10 |
| 9,513,045 | B2 | 12/2016 | Cox et al. |
| 9,518,773 | B2 | 12/2016 | Boarman et al. |
| 9,557,087 | B2 * | 1/2017 | Boarman ............ F25C 5/22 |
| 9,587,871 | B2 * | 3/2017 | Cox ................. F25C 1/24 |
| 9,599,387 | B2 * | 3/2017 | Boarman ............ F25C 1/10 |
| 9,689,600 | B2 | 6/2017 | Jeong et al. |
| 9,746,229 | B2 * | 8/2017 | Visin ................. F25C 5/06 |
| 9,869,503 | B1 * | 1/2018 | Saeks ................ F25C 1/24 |
| 10,215,467 | B2 * | 2/2019 | Boarman ............ F25C 1/10 |
| 10,222,111 | B2 * | 3/2019 | Dirnberger .......... F25C 1/24 |
| 10,228,179 | B2 | 3/2019 | Fischer et al. |
| 2004/0025527 | A1 * | 2/2004 | Takahashi ........... F25C 1/18 62/340 |
| 2006/0086134 | A1 | 4/2006 | Voglewede et al. |
| 2008/0264082 | A1 * | 10/2008 | Tikhonov ........... F25C 1/04 62/137 |
| 2008/0290065 | A1 * | 11/2008 | Jennison ............ F25C 1/18 216/28 |
| 2009/0126391 | A1 * | 5/2009 | Heger .............. F25C 1/10 62/345 |
| 2009/0223230 | A1 * | 9/2009 | Kim .............. F25C 1/08 62/73 |
| 2009/0277191 | A1 | 11/2009 | Heger et al. |
| 2010/0126203 | A1 * | 5/2010 | Kim .............. F25C 5/185 62/344 |
| 2010/0275635 | A1 * | 11/2010 | Lee .............. F25C 5/06 62/344 |
| 2011/0209483 | A1 * | 9/2011 | Hall .............. F25C 1/18 62/66 |
| 2011/0314842 | A1 * | 12/2011 | Herrera ........... F25C 5/08 62/73 |
| 2012/0279240 | A1 | 11/2012 | Jeong et al. |
| 2014/0165601 | A1 * | 6/2014 | Boarman .......... F25C 5/182 62/3.3 |
| 2014/0165617 | A1 | 6/2014 | Boarman et al. |
| 2014/0165622 | A1 | 6/2014 | Boarman et al. |
| 2014/0165643 | A1 * | 6/2014 | Boarman .......... F25C 1/24 62/340 |
| 2016/0258664 | A1 | 9/2016 | Visin et al. |
| 2017/0122637 | A1 * | 5/2017 | Mor .............. F25C 1/04 |

FOREIGN PATENT DOCUMENTS

| | | |
|---|---|---|
| EP | 2660541 A2 | 11/2016 |
| GB | 977699 A | 12/1964 |
| JP | 2002350021 A | 12/2002 |
| JP | 2011064371 A | 3/2011 |
| RU | 2256128 C1 | 7/2005 |
| WO | 2006076979 A1 | 7/2006 |
| WO | 2008026843 A1 | 3/2008 |
| WO | 2008056957 A2 | 5/2008 |
| WO | 2011051136 A2 | 5/2011 |

OTHER PUBLICATIONS

International Bureau, "International Preliminary Report on Patentability" issued in connection with International Application No. PCT/US2017/027373, dated Oct. 25, 2018, 6 pages.
International Bureau, "International Preliminary Report on Patentability" issued in connection with International Application No. PCT/US2017/027379, dated Oct. 25, 2018, 6 pages.
International Bureau, "International Preliminary Report on Patentability" issued in connection with International Application No. PCT/US2017/027380, dated Oct. 25, 2018, 6 pages.
International Bureau, "International Preliminary Report on Patentability" issued in connection with International Application No. PCT/US2017/027375, dated Oct. 25, 2018, 7 pages.
United States Patent and Trademark Office, Non-Final Office Action issued in connection with U.S. Appl. No. 16/093,384, dated Mar. 27, 2020, 21 pages.
European Patent Office, "European Search Report and Written Opinion," issued in connection with Application No. 17186338.4, dated Feb. 1, 2018, 11 pages.
European Patent Office, "Extended European Search Report and Written Opinion," issued in connection with Application No. 17783119.5, dated Sep. 11, 2019, 7 pages.
European Patent Office, "Extended European Search Report and Written Opinion," issued in connection with Application No. 17783117.9, dated Sep. 11, 2019, 7 pages.
European Patent Office, "Extended European Search Report and Written Opinion," issued in connection with Application No. 17783116.1, dated Sep. 10, 2019, 7 pages.
International Searching Authority, International Search Report issued in connection with International Application No. PCT/US17/027373, dated Jul. 20, 2017, 7 pages.
International Searching Authority, International Search Report issued in connection with International Application No. PCT/US17/027375, dated Jul. 13, 2017, 7 pages.

(56) References Cited

OTHER PUBLICATIONS

International Searching Authority, International Search Report issued in connection with International Application No. PCT/US17/027379, dated Jul. 13, 2017, 7 pages.

International Searching Authority, International Search Report issued in connection with International Application No. PCT/US17/027380, dated Jul. 13, 2017, 7 pages.

United States Patent and Trademark Office, Non-Final Office Action issued in connection with U.S. Appl. No. 16/093,377, dated Jun. 22, 2020, 15 pages.

United States Patent and Trademark Office, Non-Final Office Action issued in connection with U.S. Appl. No. 16/093,390, dated Jun. 22, 2020, 12 pages.

"Refrigerator Normal Ice Production", Sep. 7, 2014, GE Appliances (Year: 2015).

United States Patent and Trademark Office, Non-Final Office Action issued in connection with U.S. Appl. No. 16/093,377, dated Oct. 6, 2020, 16 pages.

United States Patent and Trademark Office, Non-Final Office Action issued in connection with U.S. Appl. No. 16/093,390, dated Oct. 6, 2020, 13 pages.

* cited by examiner

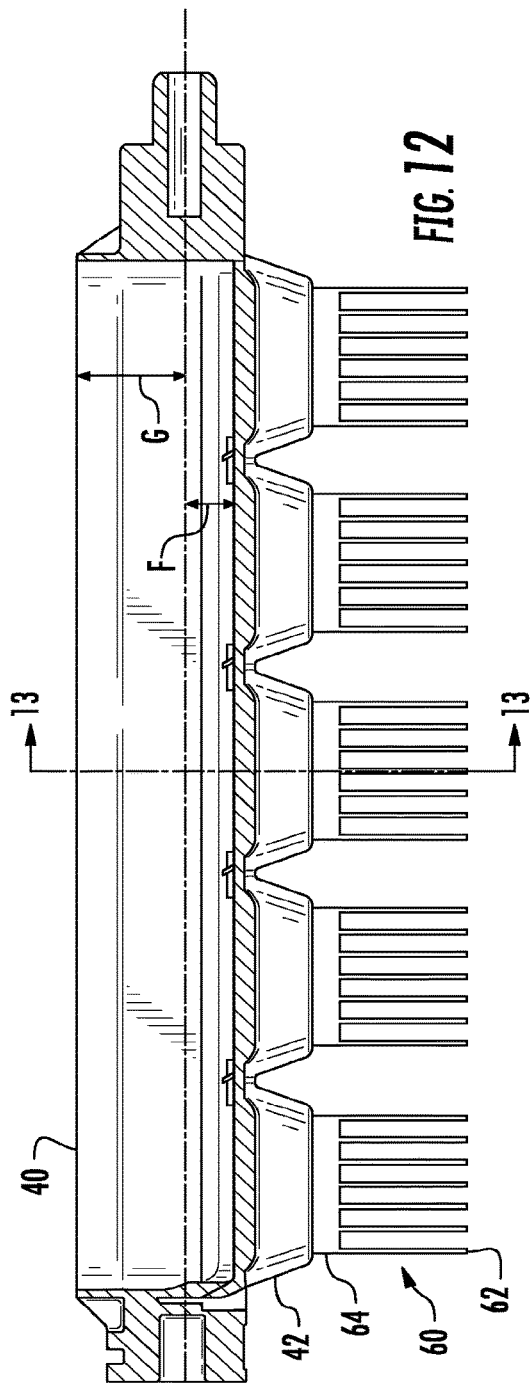
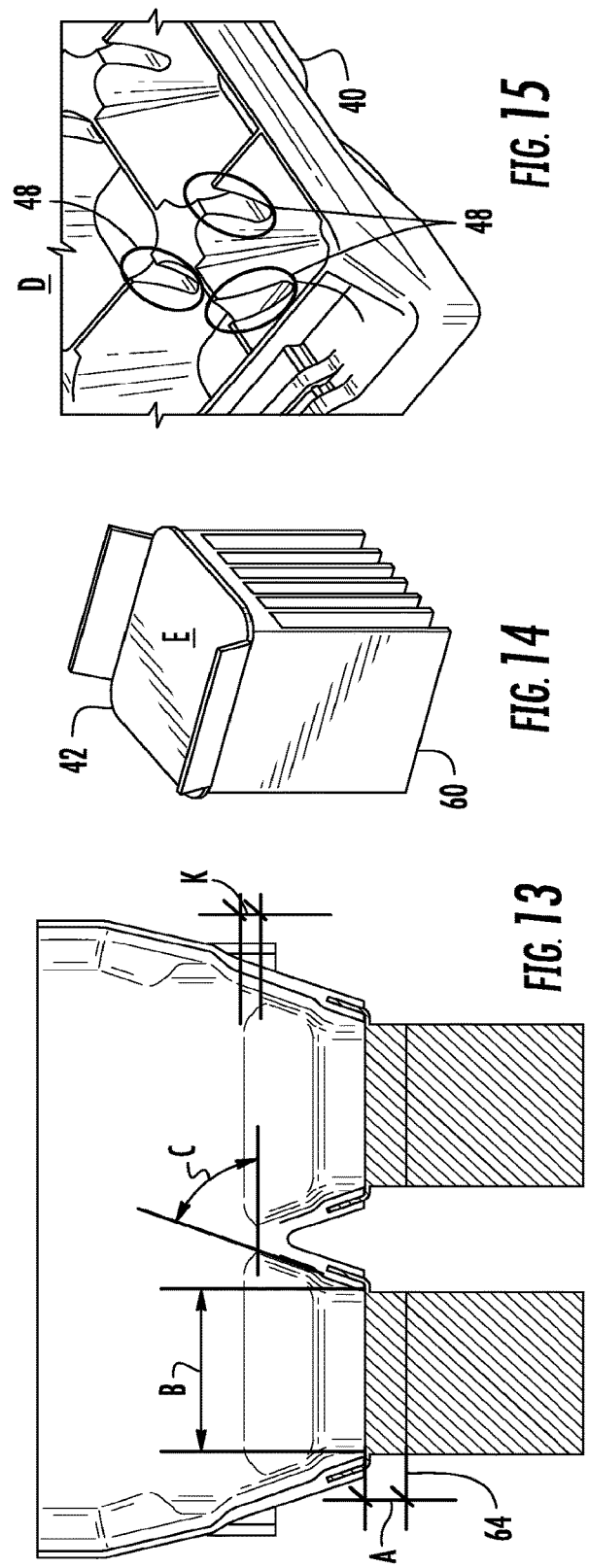

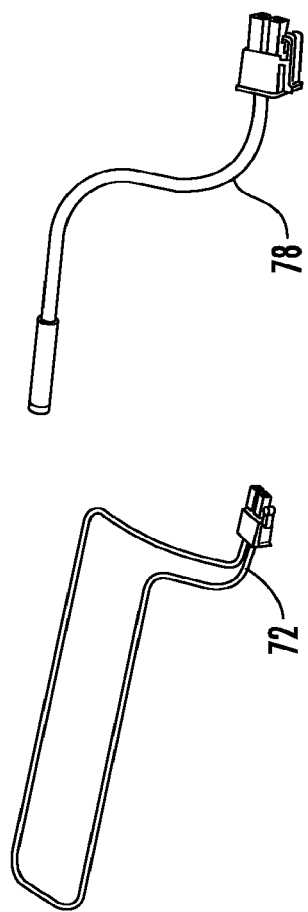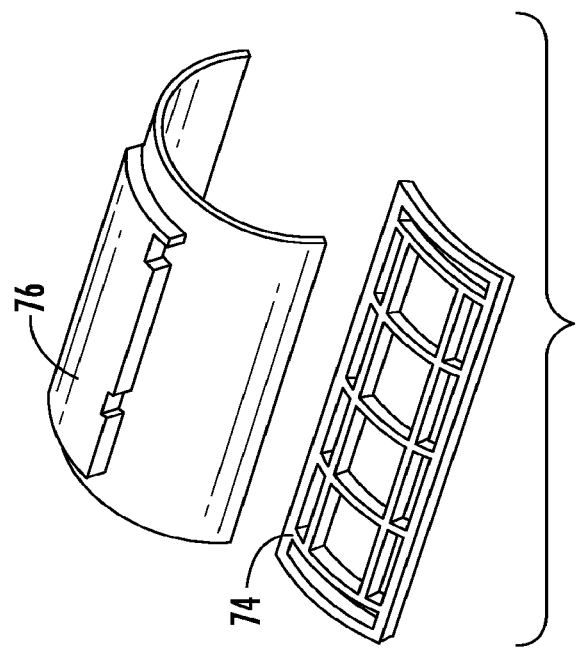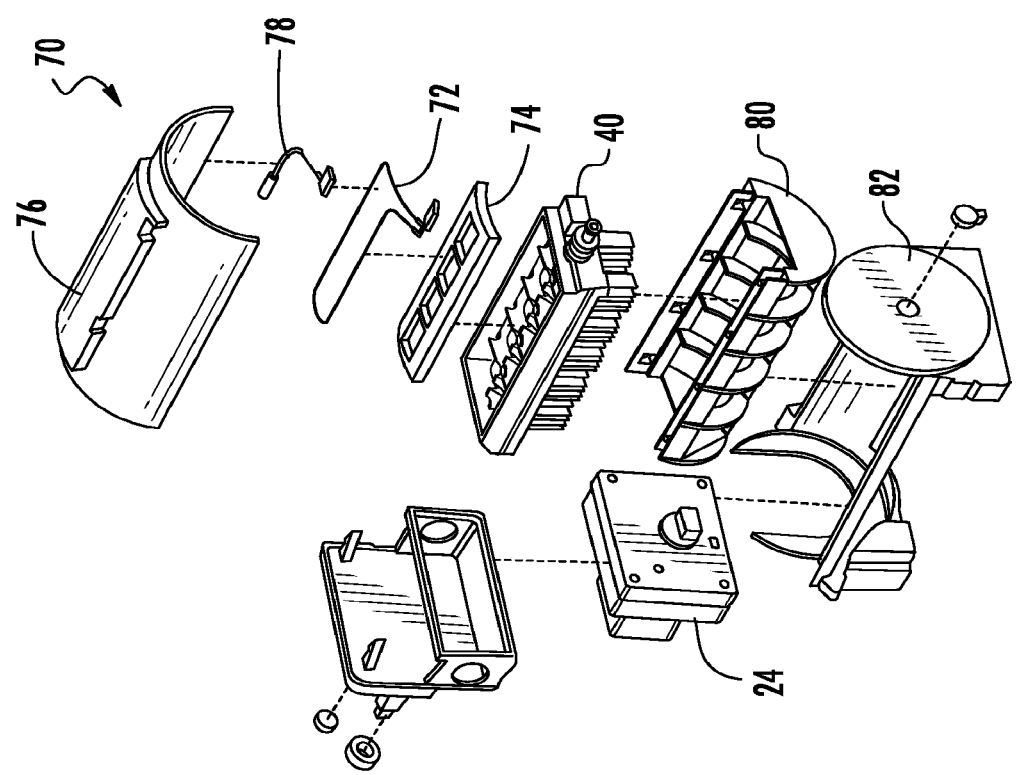

CLEAR ICE MAKING APPLIANCE AND METHOD OF SAME

CROSS-REFERENCE TO RELATED APPLICATION

This application is a US National Phase Application of and claims benefit of and priority to PCT/US17/27380, filed on Apr. 13, 2017, entitled "CLEAR ICE MAKING APPLIANCE AND METHOD OF SAME." PCT/US17/27380 claims priority to and the benefit of Provisional U.S. Patent Application 62/322,157, entitled "CLEAR ICE MAKING APPLIANCE AND METHOD OF SAME" filed Apr. 13, 2016, which is hereby incorporated by reference in its entirety.

SUMMARY

An aspect of the present disclosure is generally directed to an ice making appliance that includes: an ice making compartment; an ice maker located in the ice making compartment and including an ice mold having a total water capacity; a motor disposed in the ice maker and operably coupled to a first end of the ice mold; a stop disposed on an end of the ice maker distal from the motor and configured to prevent rotation of a second end of the ice tray during harvesting; a water inlet disposed in the ice making compartment and in fluid communication with the ice mold. The ice mold includes a plurality of ice wells and is configured to release the ice cubes without the use of a heater and by twisting the ice mold. The ice wells are typically no more than about 12.2 mm in depth from a top surface of the ice mold and have a volume of about 20 mL or less. The ice maker is capable of producing at least about 3.5 lbs. of ice or more in a 24 hour span.

Another aspect of the present invention is generally directed to a method of forming substantially clear ice that includes the steps of: providing an ice maker within a refrigerated appliance where the ice maker includes: an ice mold having a full capacity including a plurality of ice wells; a motor operably connected to the ice mold and capable of rotating the ice mold; and a fill tube fluidly connected to a source of household water; filling the ice mold with a seed fill of water which is about 20% of the capacity of the ice mold; rotating the ice mold clockwise from about 30 degrees to about 50 degrees from horizontal and thereafter pausing for first period of time of at least about 3 seconds; rotating the ice mold counter-clockwise from about 30 degrees to about 50 degrees from horizontal and thereafter pausing for a second period of time of at least about 3 seconds; rotating the ice mold back to a substantially horizontal position; filling the ice mold with water to the full capacity of the ice mold; and freezing the water in the ice mold.

Still another aspect of the present disclosure is generally directed toward an ice making appliance that includes: an ice making compartment; an ice maker located in the ice making compartment and including an ice mold having a total water capacity; a motor disposed in the ice maker and operably coupled to a first end of the ice mold; a stop disposed on an end of the ice maker distal from the motor and configured to prevent rotation of a second end of the ice tray during harvesting; a water inlet disposed in the ice making compartment and in fluid communication with the ice mold. The ice mold includes a plurality of ice wells. The ice mold is configured to release the ice cubes by twisting the ice mold and without the use of a heater. The ice making appliance further typically includes a heater disposed above the ice mold and in electrical communication with a control; a thermistor in electrical communication with the control positioned above the ice mold; and a cold source that delivers cold air to the ice making compartment whereby the heater causes the cold air traveling over the ice mold to be warmer than the cold air traveling under the ice mold and through the plurality of heat sinks engaged to the bottom of each ice well of the ice mold.

Another aspect of the present disclosure includes an ice making appliance having: an ice making compartment; an ice maker located in the ice making compartment and having an ice mold having a total water capacity; a motor disposed in the ice maker and operably coupled to a first end of the ice mold; a stop disposed on an end of the ice maker distal from the motor and configured to prevent rotation of a second end of the ice tray during harvesting; and a water inlet disposed in the ice making compartment and in fluid communication with the ice mold. The ice mold includes a plurality of ice wells and a plurality of heat sinks with a heat sink thermally engaged with a bottom of each ice well and having a plurality of downwardly extending, planar heat sink fingers. The ice mold is configured to release the ice cubes by twisting the ice mold and without the use of a heater. The ice making appliance also typically includes a heater disposed above the ice mold and in electrical communication with a control; a thermistor in electrical communication with the control positioned above the ice mold; a cold source that delivers cold air to the ice making compartment whereby the heater causes the cold air traveling over the ice mold to be warmer than the cold air traveling under the ice mold and through the plurality of heat sinks engaged to the bottom of each ice well of the ice mold; and an air channeling bracket disposed over the bottom of the ice tray and operably connected thereto where the air channeling bracket has cold air inlets and air outlets that are positioned to channel cold air from the cold source through the air channeling bracket and through a plurality of spaces between the downwardly extending fingers of the heat sink.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12 is a side view cross section of the ice tray with heat sinks.

FIG. 13 is a front view of a cross section of an ice tray of an embodiment.

FIG. 14 is an isometric view of heat sink of an embodiment.

FIG. 15 shows a corner of the ice tray weir configuration.

FIG. 16 is an exploded view of the icemaker of an embodiment.

FIG. 17 shows a heater of an embodiment.

FIG. 18 shows a thermistor of an embodiment.

FIG. 19 shows a heater bracket and cover of an embodiment.

DETAILED DESCRIPTION

Figure 1:
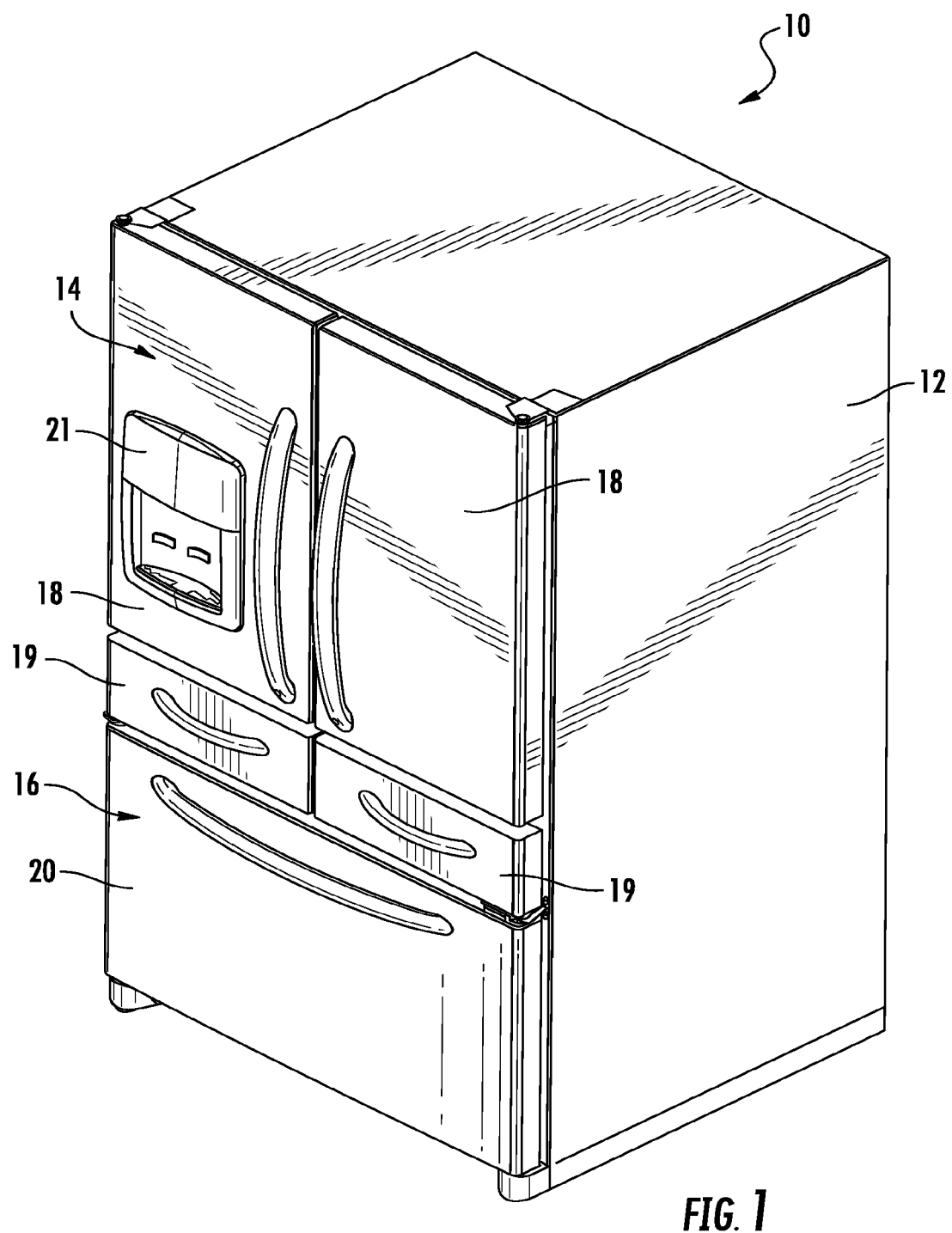
FIG. 1 is an upper perspective view of a refrigerator as disclosed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 illustrates one embodiment of a refrigerator 10. The refrigerator 10 includes a refrigerator housing or cabinet 12. Two fresh food doors 18 provide access to a fresh food compartment 14. While two doors are shown, it should be appreciated that only one is needed for the present disclosure. A freezer door 20 provides access to a freezer compartment 16. The refrigerator 10 is shown in a bottom mount configuration where the freezer compartment 16 is positioned below the fresh food compartment 14. An ice and water dispenser 21 is positioned on one of the fresh food compartment doors 18. Note that the ice and water dispenser 21 is positioned remotely from the freezer compartment 16. While this particular configuration of the refrigerator 10 is shown in FIG. 1, it should be appreciated that other types of refrigerators may be used with the present disclosure.

Figure 2A:
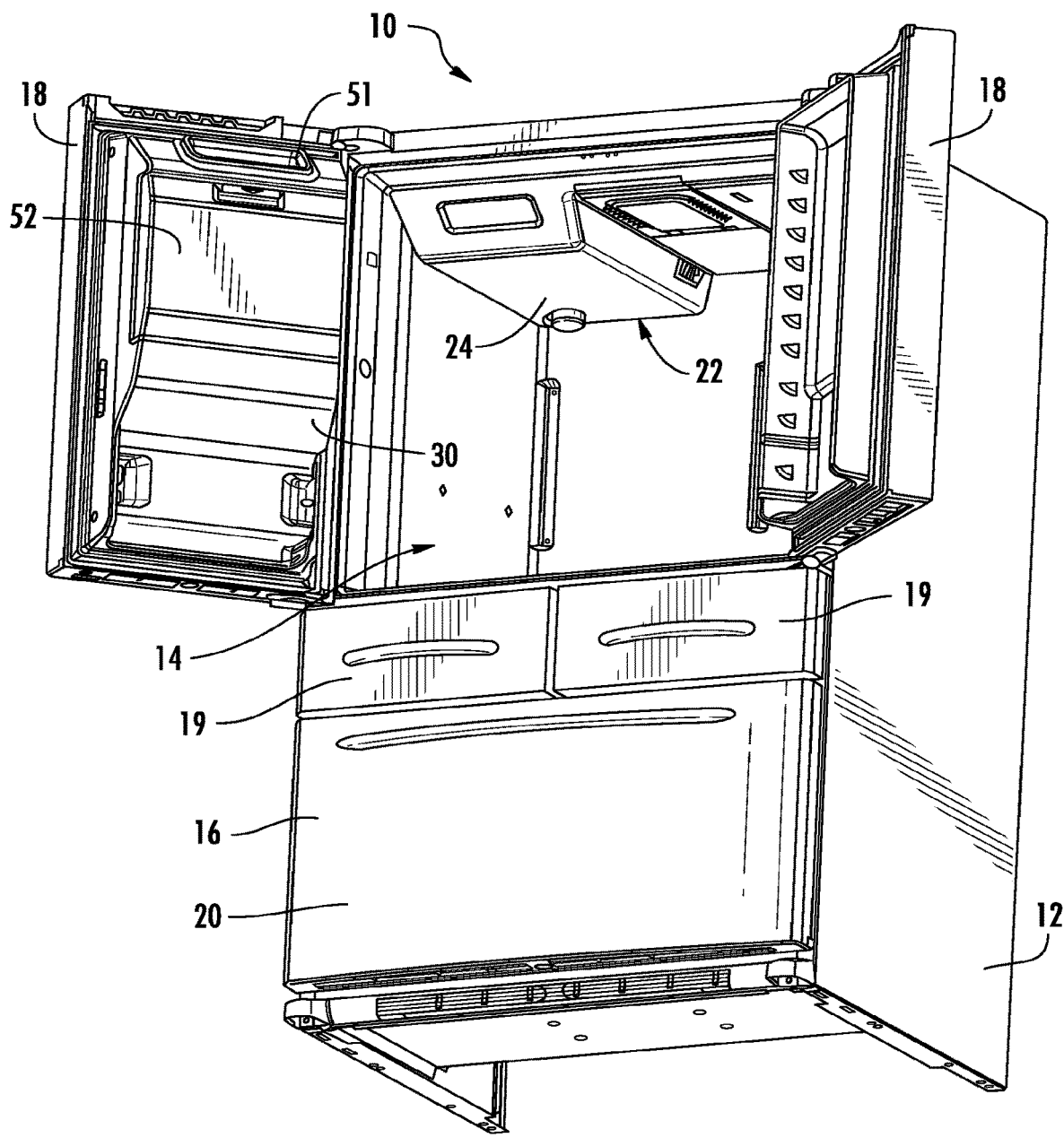
FIG. 2A is a perspective view of a refrigerator as disclosed with the fresh food doors open.
Figure 2B:
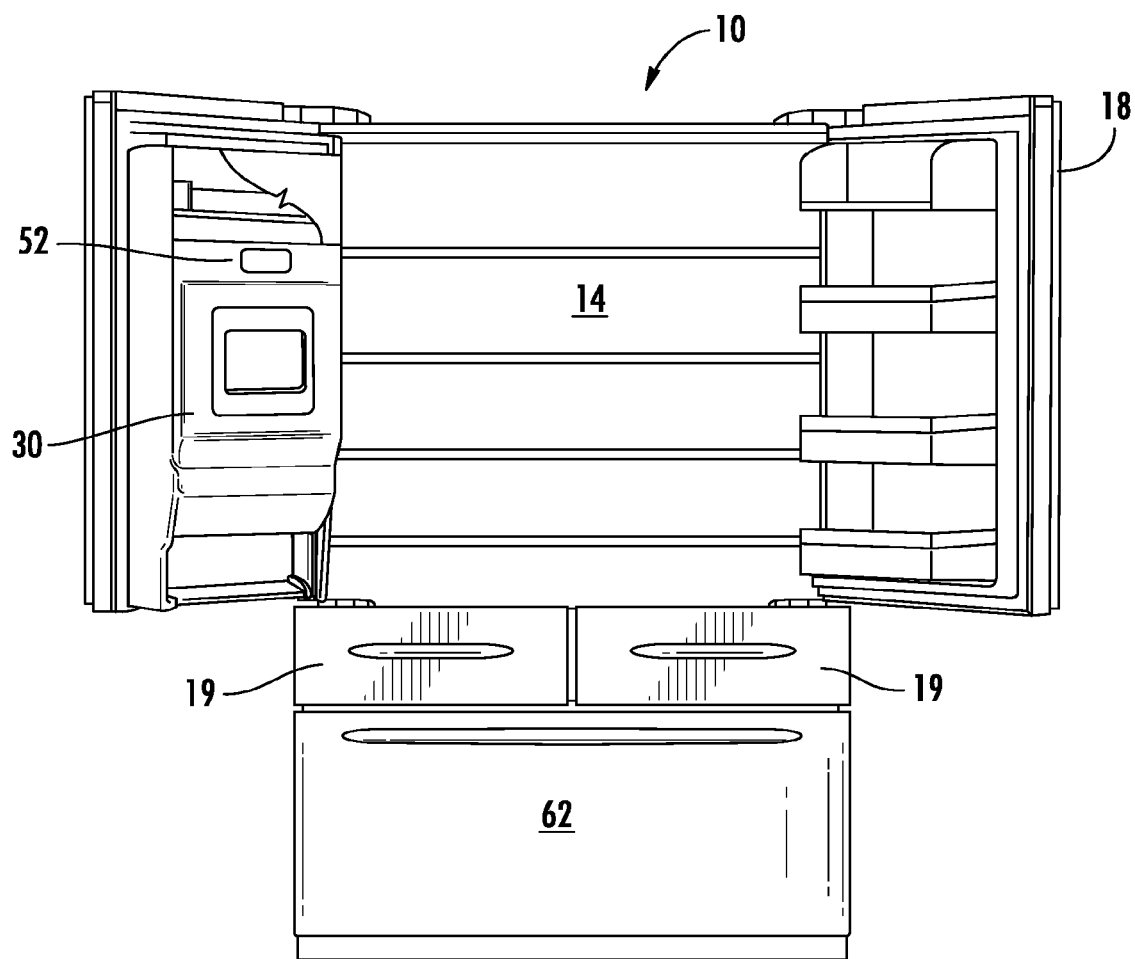
FIG. 2B is a front view of a refrigerator as disclosed with the fresh food doors open.

FIGS. 2A and 2B illustrate the refrigerator 10 of FIG. 1 with the fresh food doors 18 in an open position. With respect to FIG. 2, an ice making compartment 22 is shown positioned within the fresh food compartment 14, and adjacent one of the fresh food doors 18. FIG. 3 illustrates the refrigerator 10 of FIG. 1 with the fresh food doors 18 in an open position wherein the ice making compartment 22 is located on one of the fresh food doors 18. An ice storage compartment 30 is provided adjacent to the ice making compartment 22 on one of the fresh food doors 18. The ice storage compartment may include a removable ice bucket 52 and the compartment 30 is used to store formed ice cubes.

Figure 3A:
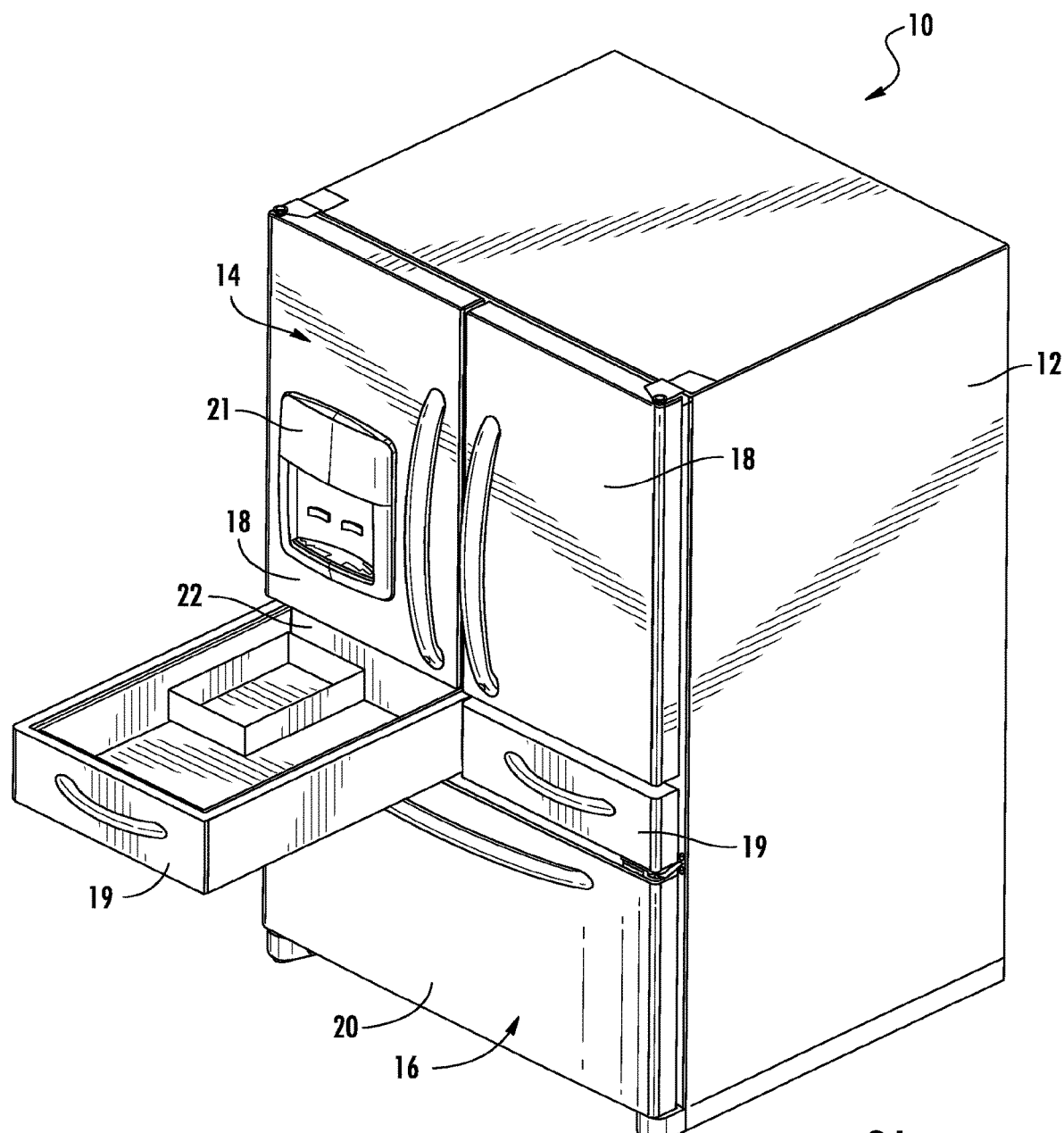
FIG. 3A is a front view of a refrigerator as disclosed with the icemaker in the drawer.
Figure 3B:
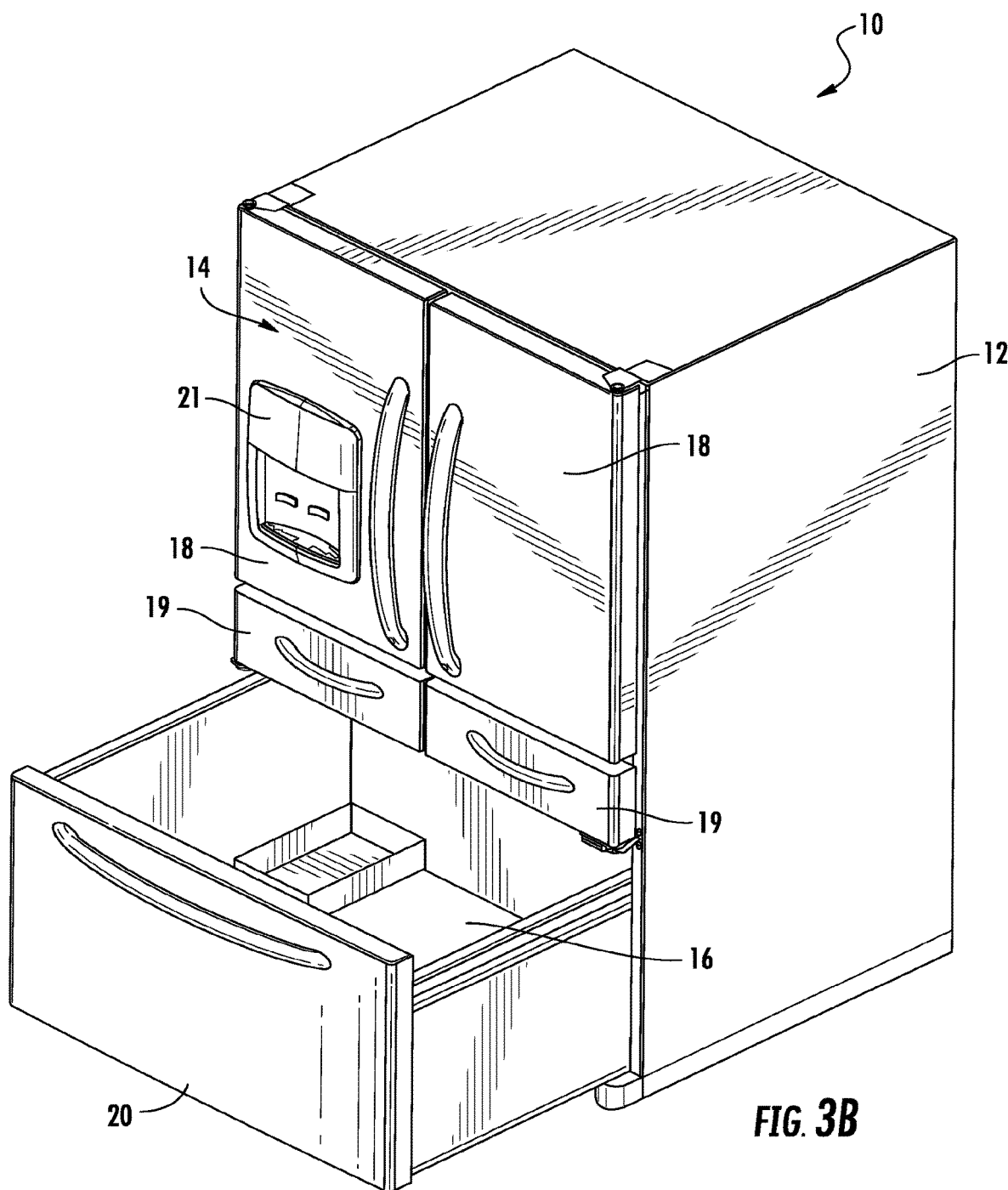
FIG. 3B is a front view of a refrigerator with the icemaker in the freezer compartment.

FIG. 3A illustrates a French-door bottom mount-type refrigerator with refrigerated drawers. The refrigerator may have the icemaker located in a drawer compartment 19 of the refrigerator. FIG. 3B illustrates a similar-type refrigerator with the icemaker located in the freezer compartment 16. It should be noted that this may also be implemented in a French-door bottom mount-type refrigerator without drawers 19.

Figure 4A:
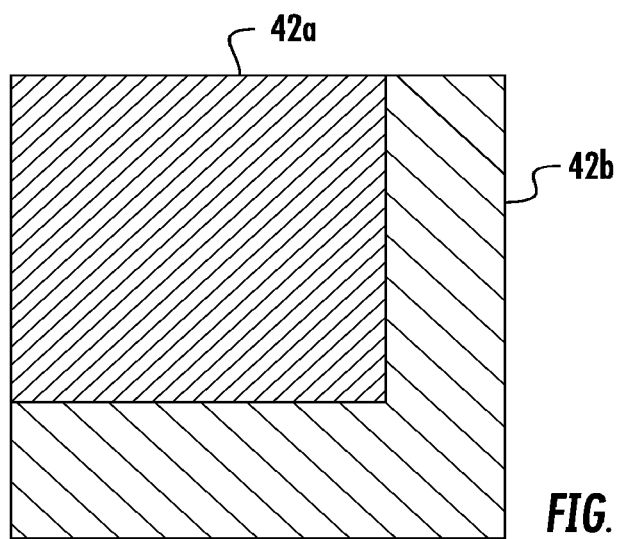
FIG. 4A is a plan view comparison of a standard ice well and an ice well as disclosed.
Figure 4B:
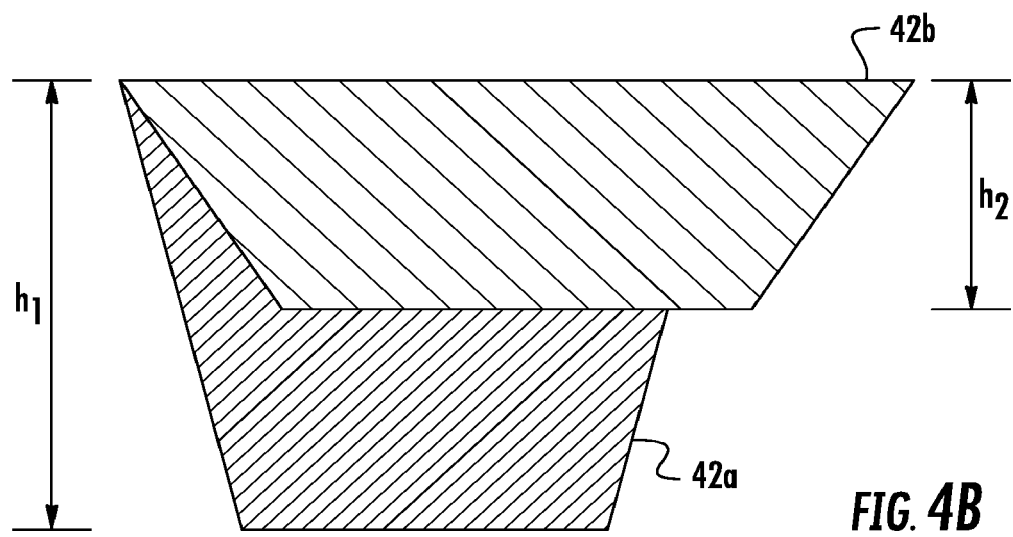
FIG. 4B is a side view comparison of a standard ice well against the ice well as disclosed.
Figure 5A:
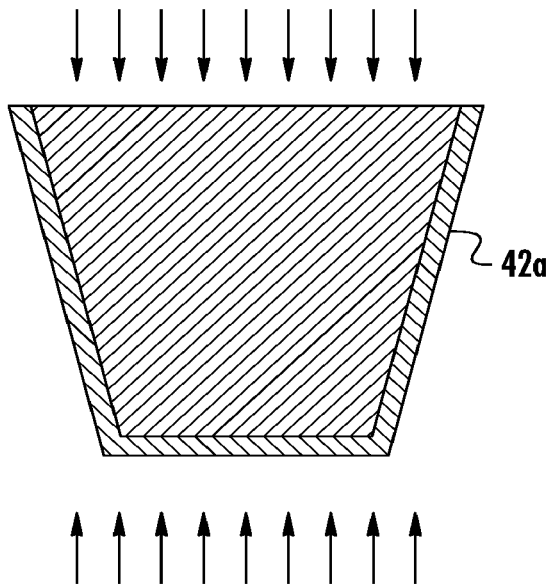
FIG. 5A shows air flow over standard ice wells.
Figure 5C:
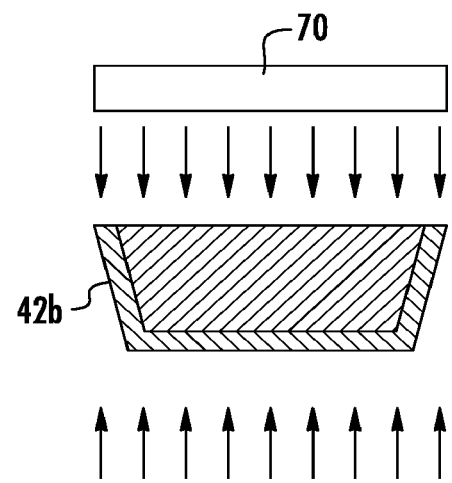
FIG. 5C shows cold air flow underneath the ice tray and air flow at a temperature warmer than the freezing point of water blown over the top of the ice tray as disclosed.
Figure 5B:
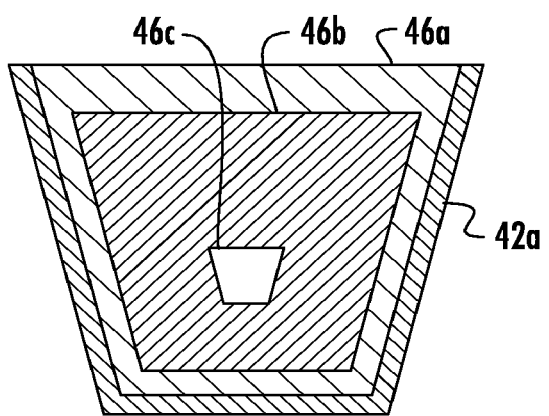
FIG. 5B shows freezing regions of a standard ice well.
Figure 5D:
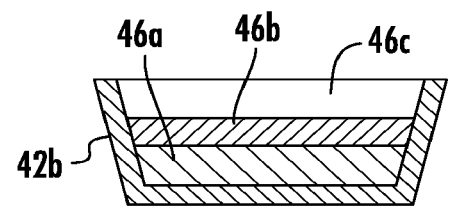
FIG. 5D shows freezing regions of the ice well as disclosed.
Figure 6A:
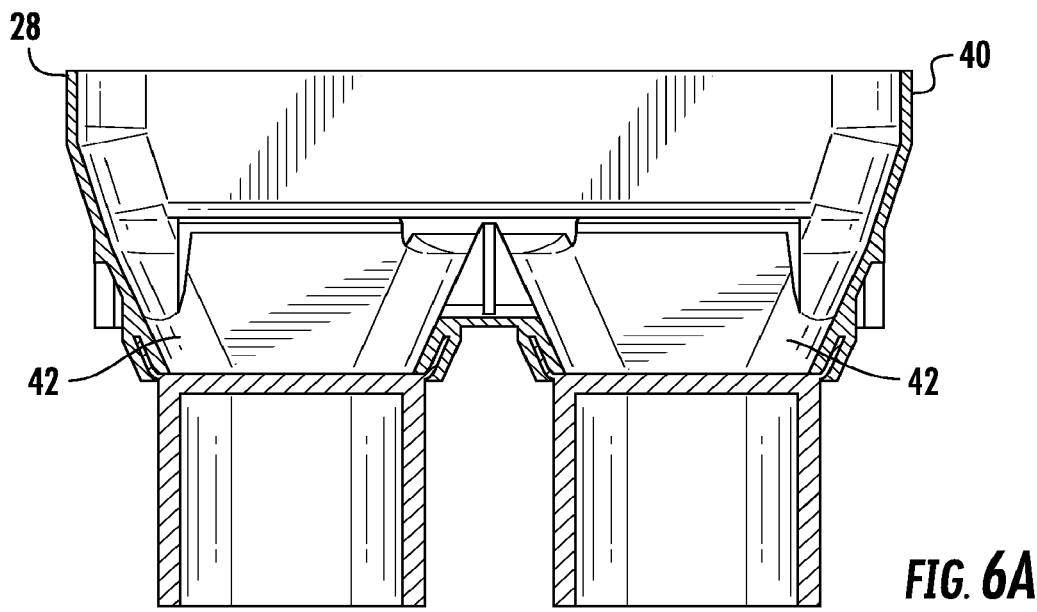
FIG. 6A is a cross section of the ice tray shown in FIG. 6B along line 6A-6A.
Figure 6B:
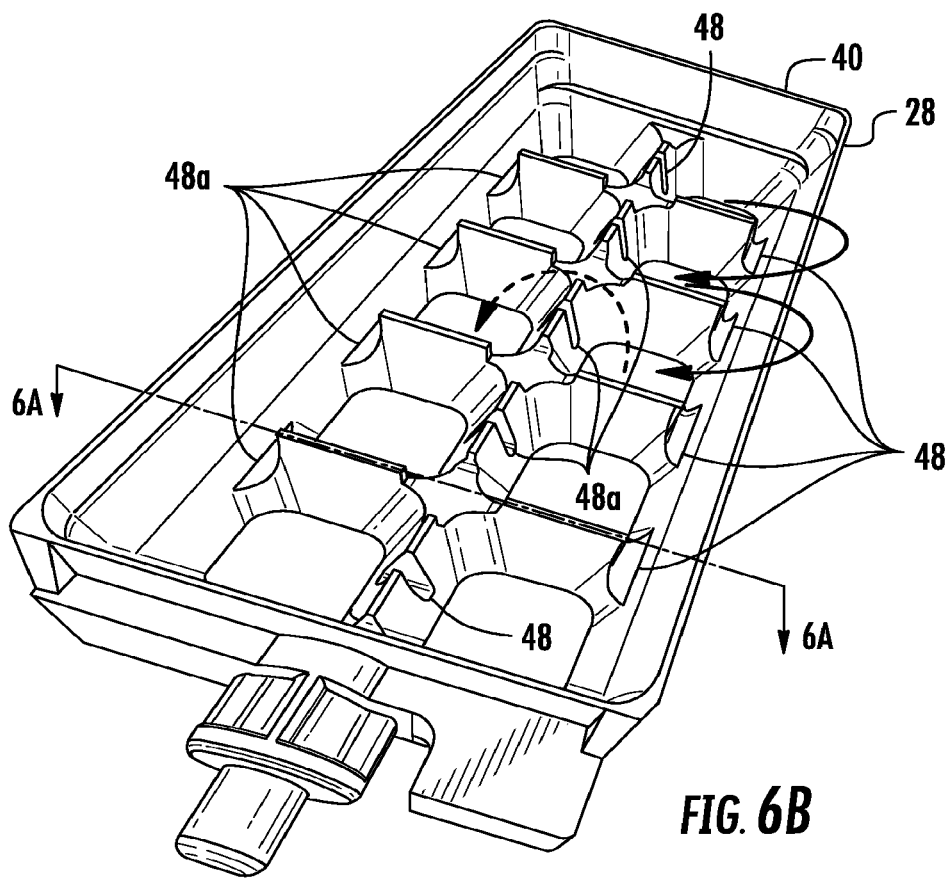
FIG. 6B is a perspective view of the ice tray of the icemaker as disclosed.

FIGS. 4-6 show the differences in ice wells or ice cavities 42 in an ice tray 40 between 42a of the typical ice tray or mold 40 and the ice wells 42b of present disclosure. The ice tray 40 may have a perimeter wall 28 (See FIG. 6B) configured to keep water from spilling out of the ice tray 40, and a plurality of ice wells 42 formed in rows and columns as shown in FIG. 8B. The ice tray 40 as shown has 2 columns of 5 rows of wells, but it is understood that any other configuration may be employed.

The ice wells 42b may have a larger surface area on the top and the bottom of the ice well 42b as well as being of a shallower depth. FIG. 4A shows a plan view of the ice wells 42. As shown in FIG. 4A, ice well 42b is about 20-25 mm on both sides, more preferably about 23 mm on each side, as compared with the typical ice well which is about 18-20 mm on a side. The dimension h2 may be about 10-15 mm, more preferably about 12.2 mm as shown as opposed to the depth h1 of the current typical ice tray, which is about 20-25 mm, for a reduction of about 32% in height. This design allows not only for clear ice which is directionally frozen from the bottom of the ice cube to the top, but also a faster freezing time, allowing for about 3.5-4.0 lbs of ice per day to be formed, or about a 20-40% increase in ice production.

Since ice is an insulator, the decrease in cube height that is formed by the ice wells 42b allows the heat to be transferred from the top layers more efficiently. The larger cube base surface area allows for more water to be exposed to the cold air under the tray 40 and thus allowing for more efficient heat transfer from the water to the passing air. This gained efficiency in heat transfer within the cube itself improves the ice production rate of the icemaker within a refrigerator 10.

FIGS. 5A and 5B show what happens in a typical ice well. As shown in FIG. 5A, the ice well 42a, typically made of plastic or metal, has cold air flow as shown by the arrows above and below the ice well 42a. This air flow over the top of the water and underneath the ice well 42a, allows the outer ring 46*a* of the water to freeze first in the ice cube as shown in FIG. 5B. The first layer to freeze 46*a* is an outer layer of the cube, followed by an inner layer denoted by 46*b*, and finally the center of the ice cube denoted 46*c* is frozen. This inward direction of freezing of the ice cube 46 prevents the ice cube from being formed in a generally clear formation.

The embodiment as shown by 5C and 5D allows the ice cube to freeze in a generally upward direction from the bottom of the ice cube to the top. As shown in FIG. 5C, cold air may be blown underneath the ice tray 40, cooling the bottom side of the ice tray 40. The water within the ice tray 40 may cool and freeze first on the bottom, and the ice cube may be cooled and frozen in a generally upward direction from there. FIG. 5D shows this order of freezing as the first layer 46*a* along the bottom of the cube, then layer 46*b*, and finally 46*c*. It should be noted that the actual freezing may not take place in distinct layers as shown, but rather in a continuous fashion from bottom to top, but for ease of display the direction of freezing was broken into distinct layers. In order to keep the top of the ice cube from freezing, air at a temperature warmer than the freezing point of water may be blown over the top of the ice tray 40, as denoted by the arrows on the top of FIG. 5C. However, it is important not to blow air that is too warm over the top of the ice tray 40, as this has a detrimental effect on freezing times.

In order to warm the air blowing over the top of the ice tray 40, a heater assembly 70 may be employed. As detailed in FIG. 16, the heater assembly 70 may include a heater 72, which may be an electric resistance heater or any other heater type known in the art. The heater 72 may be disposed on a heater bracket 74, which houses the heater 72 as well as a thermistor 78. The heater, thermistor, and bracket are all covered by a bracket cover 76. The heater and the thermistor are in electrical communication with a controller (not shown) of the appliance. During ice formation, the thermistor senses the temperature of the air being blown over the top of the ice tray 40.

To create the ideal state for directional freezing the cold (below 31° F.) freezer air is directed across the bottom of the tray. The top of the tray 40 may be kept at a temperature above the freezing point of water (>32° F.). To accomplish this an active control is required to maintain the temperature. If the temperature is too high the ice formation rate and energy usage is negatively impacted. If the temperature is too low, it does not allow for the directional cooling as described. This temperature is preferably between about 37° F. and about 43° F. To maintain this temperature range the heater 72 is used with feedback temperature sensor or thermistor 78 to allow for heater control and temperature monitoring. The heater 72 is incorporated into a cover 76 over the ice tray 40 isolating the top of the ice tray 40 from the surrounding air allowing the icemaker to be stored in a freezing environment. The temperature sensor 78 signals the control to turn on the heater if temperature drops below a minimum set point and then off as it rises above the maximum set point.

In another embodiment, heat may be added via an air duct, damper, fan, and temperature sensor 78. This will again be a closed loop temperature controlled system, but instead of using an electric heater 72 it will use a damper and fan to direct air to the top of the tray 40. The air supplied from within the refrigerated compartment or similar area that is maintained above the water freezing point. The damper may open if the temperature drops below a given threshold and may close as it approaches the upper temperature limit.

In another embodiment, waste heat from the electric motor 24 driving the ice tray is used during the freezing process described above. The motor 24 may generate enough waste heat to maintain this temperature, and a fan (not shown) may direct the waste heat above the ice tray with a temperature sensor or thermistor 78 controlling the fan operation based on minimum and maximum allowed temperatures.

This directional freezing is crucial for production of clear ice, as the impurities and air pockets within the cube are forced to the top of the ice cube and may be released into the ambient air within the ice making compartment, as opposed to being forced toward the middle of the ice cube in a typical ice tray. The impurities and air pockets are forced inward a due to the phase change of the water to ice. The bottom surface area is crucial for increasing the rate of production of ice in this system. The bottom surface area for ice well 42*b* is about 28% greater than the current typical ice well.

FIG. 6A-6B describe the filling process in more detail. A seed fill may be used in the ice making process. A seed fill is a small portion of the overall ice tray water capacity introduced into the ice tray, before the ice tray 40 is filled in earnest. This seed fill prevents a filled-to-capacity ice tray from super cooling and preventing the directional freezing as described below.

In a typical ice tray 40 there are weirs 48 between the sets of ice wells 42. These weirs 48 distribute water between the ice wells 42 such that the amount of water in each ice well 42 is relatively even. These weirs 48 are typically not very deep, as deep weirs add to the structural rigidity of the ice tray 40, making removal of the ice from the ice tray 40 more difficult, because it takes more force to twist the ice tray 40 to remove the ice cubes from the ice tray 40. This also prevents an icemaker with a single fill tube 50 from distributing a seed fill into the ice tray without the use of multiple fill tubes 50.

By adding extra weirs 48*a* at the end of the ice wells, water is allowed to flow more freely between the rows of ice wells as opposed to just across the columns of ice wells 42. As described herein the rows of ice wells are defined as those ice wells normal to the axis of rotation, and the columns are the ice wells along the axis of rotation. These weirs between the rows of ice cavities may be closer to the ice tray perimeter 28, to allow the water to flow more freely as it is rocked back and forth. These deeper weirs 48 allow a lower amount of seed fill water to be introduced to the ice tray 40 and allow the seed fill to travel between the ice wells in a generally even fashion. This configuration allows a seed fill of about 20% of the total capacity of the ice tray, wherein without this configuration a seed fill of less than about 50% may not be able to traverse between ice wells to provide an even fill across the ice wells 42.

Figure 7A:
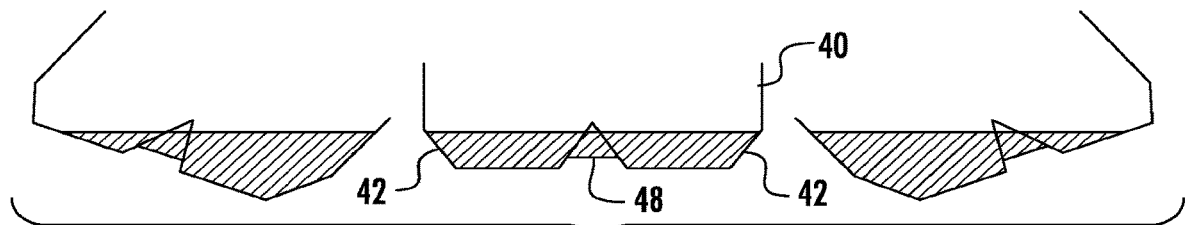
FIG. 7A shows rocking motion of the ice tray in an embodiment.
Figure 7B:
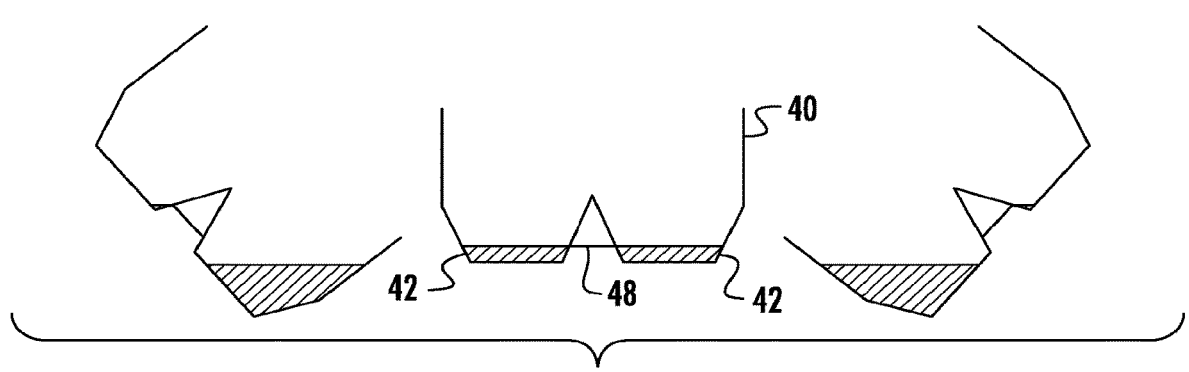
FIG. 7B shows another rocking motion of the ice tray in an embodiment.

Further, as shown by FIG. 7A-7B, during the seed fill the tray 40 may be oscillated at a specific angle and frequency. A motor 24 may be operably coupled with the ice tray 40 at one end of the ice tray 40. The motor 24 may be in electrical communication with a control (not shown) which may be microprocessor or a microcontroller, or anything else known in the art. The angle and frequency is determined by the water movement within the specific tray 40 for efficient transfer of water from side to side to promote the successful washing of water as the water freezes. It is also based on the fill volume to prevent water from spilling over the sides of the ice tray 40. This rotation aids in allowing impurities within the water to escape and the water to freeze as clear ice.

Figure 25:
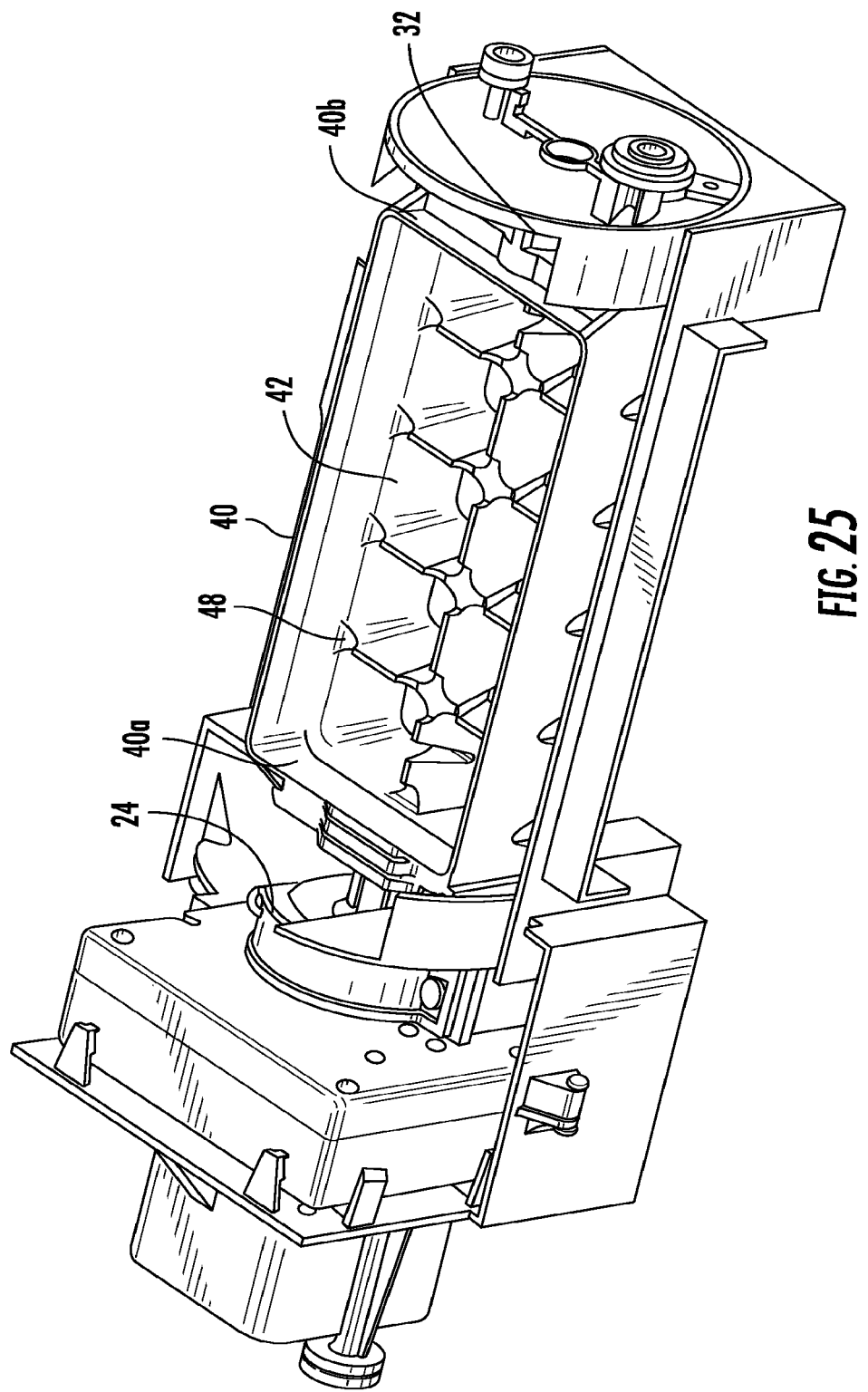
FIG. 25 is an isometric view of an icemaker of an embodiment.

The tray may be rotated an angle of 30-50 degrees, more preferably about 40 degrees clockwise and counterclockwise, in any event not as far as to engage a stop 32 (see FIG. 25). As the tray is rotated clockwise and counterclockwise, the tray may be held for 2-5 seconds to allow the water migration from cube to cube, more preferably about 3 seconds. This rocking motion and method is capable of distributing about 20 cubic centimeters of water across the ten cubes as shown in the tray 40 substantially evenly, or about 2 cubic centimeters per ice cube, with total ice cube volume of about 10 cubic centimeters each. This rotation facilitates even dispersement of the fill water within the ice mold 40 prior to freezing.

Figure 8A:
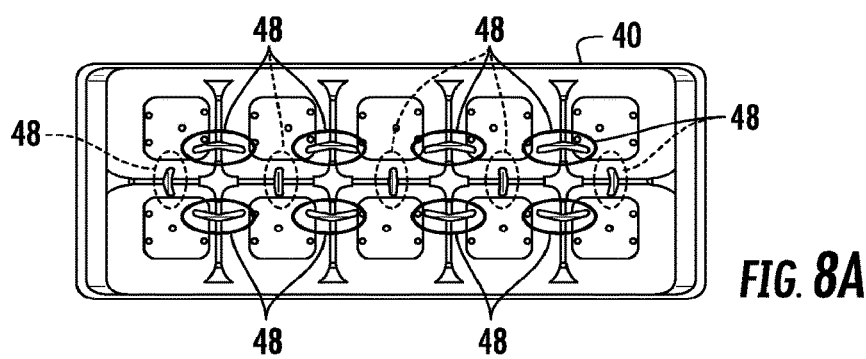
FIG. 8A is a plan view of a standard ice tray weir configuration.
Figure 8B:
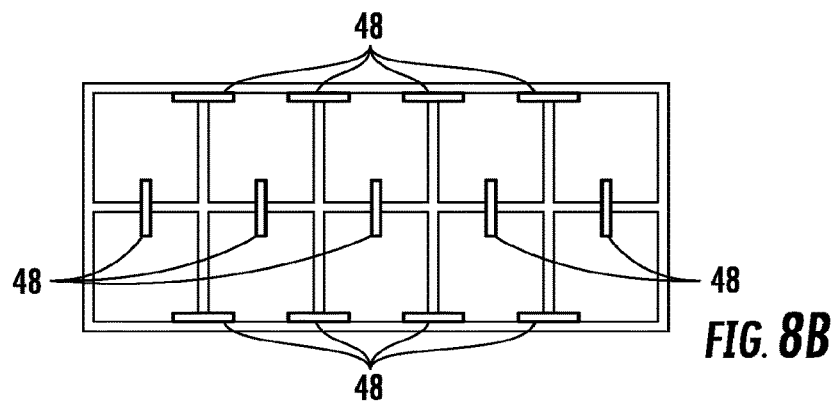
FIG. 8B shows a plan view of an ice tray with the weir configuration of an embodiment.

FIGS. 8A and 8B show the weir configuration of typical ice trays 40 as well as the new design. FIG. 8A shows the typical ice tray 40 with weirs along the rows near the middle of the ice tray 40 and between the columns generally in the center of the ice wells. FIG. 8B shows the ice weirs as disclosed with the weirs between the rows generally in the center of the ice wells and the weirs 48 between the columns near the outer edge of the ice tray 40. Because the weirs are located near the edge of the ice tray or mold 40, the water may more easily traverse between the ice wells 42 during the rocking motion. This allows for more even distribution as the ice tray 40 is rocked clockwise and counterclockwise. Further, the location of the weirs near the walls facilitates more flexibility, even though deeper weirs generally make the tray 40 more rigid, because there is less plastic connected to the side walls of the ice tray 40.

Figure 9A:
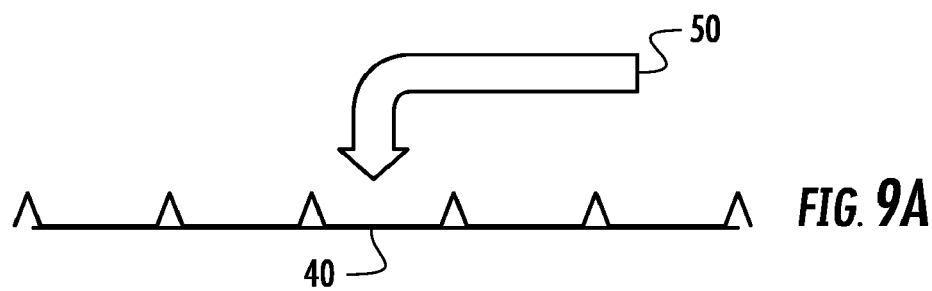
FIG. 9A shows a single fill method of an embodiment.
Figure 9B:
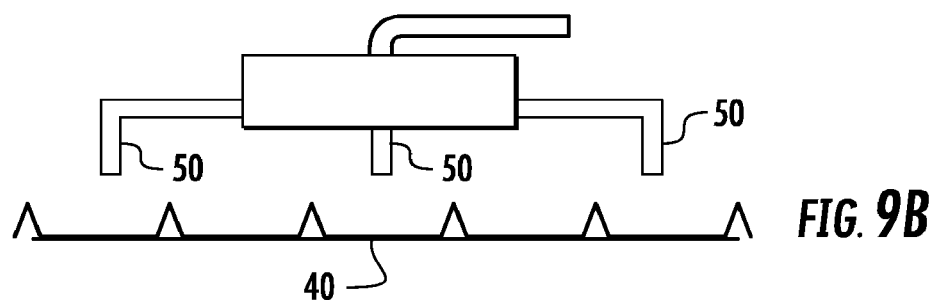
FIG. 9B shows a multiple fill tube method of an embodiment.
Figure 9C:
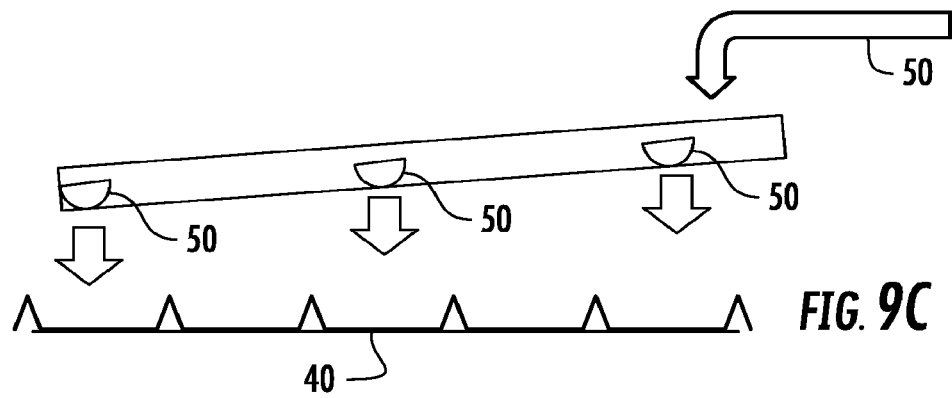
FIG. 9C shows a trough fill method of an embodiment.

FIG. 9A-9C show three different methods of filling an ice tray through a fill tube 50. FIG. 9A shows the fill as disclosed with a single fill tube generally in the middle of the ice tray 40. FIG. 9B shows a method of introducing fill evenly across all of the ice wells by using multiple fill tubes from a single water inlet. These fill tubes may be located at an end proximate the motor end of the ice tray 40, one approximately in the center of the ice mold, and another proximate the end distal from the motor. FIG. 9C discloses another way of introducing multiple fill tubes by using a trough with multiple points of entry into the ice tray 40. The trough is generally downhill from the water supply to a distal end of the ice tray 40. This allows the water to flow into the trough in a generally downhill fashion from the near end of the water fill to the far end of the trough.

Figure 10:
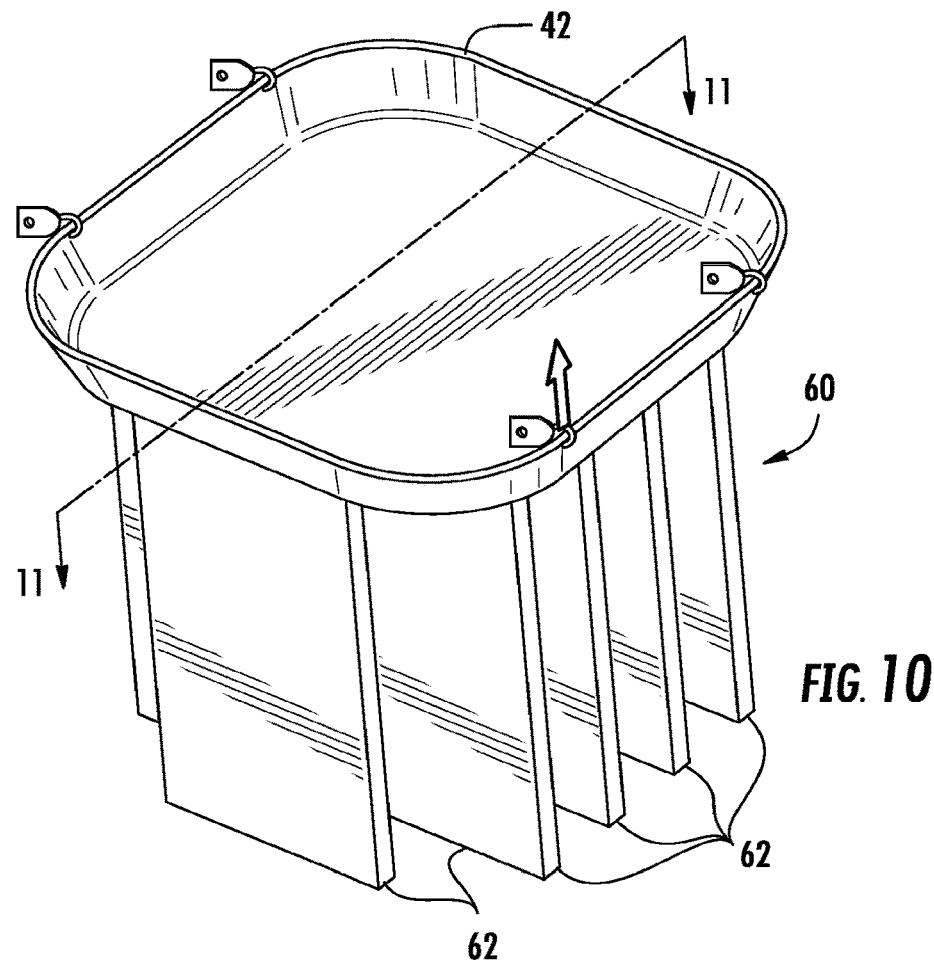
FIG. 10 shows an isometric view of a heat sink of an embodiment.
Figure 11:
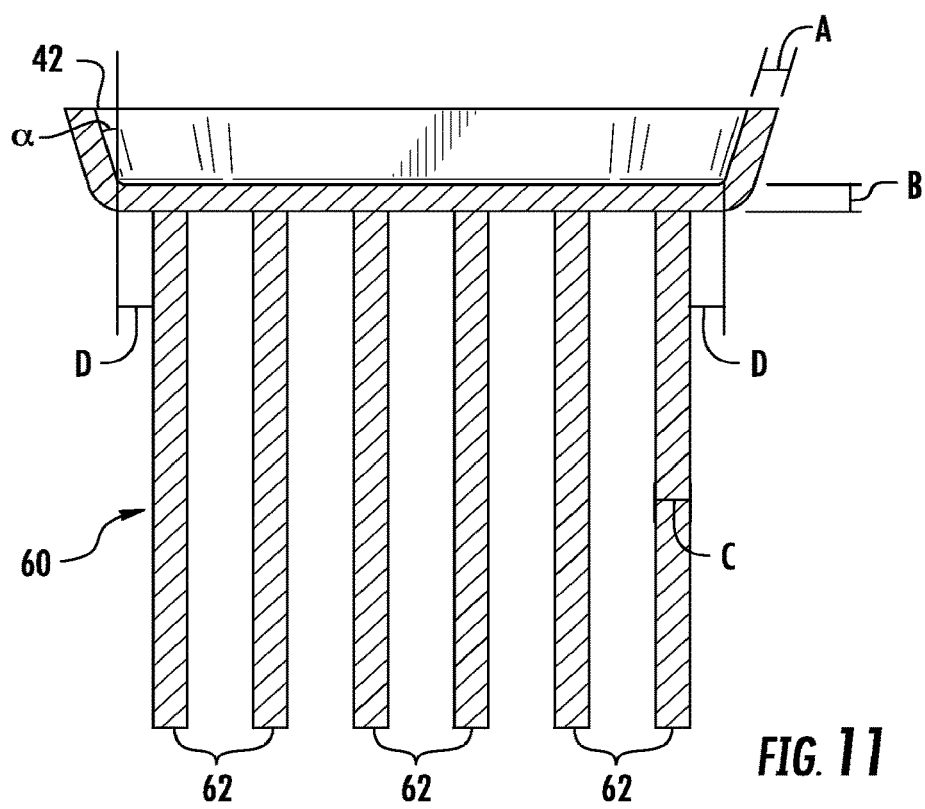
FIG. 11 is a cross section through the heat sink of an embodiment.

FIGS. 10 and 11 generally show the addition of heat sinks 60 to the bottom of the ice wells 42. The heat sink 60 may be comprised of one or more heat sinks fingers 62. These heat sinks fingers 62 allow more efficient heat carrying capabilities to remove the heat from the water in the ice well 42 into the air flow below the ice wells that passes around and between the heat sink fingers 62. The fingers 62 have a thickness (denoted by dimension C in FIG. 11) and comprise a pair of substantially parallel planar surfaces that extend in a generally downward direction from the bottom of the heat sink base 64.

In FIG. 11 the thickness of the ice well 42 is denoted by dimension A and is generally 0.6 to 1.0 millimeters, preferably 0.6 millimeters, and is at an angle α, preferably about 20 degrees, from the perpendicular line coming out of the heat sink base. Dimension B is generally 0.6 to 1.0 millimeters, preferably 0.6 millimeters. The thickness of the fingers 62 is denoted by dimensions C and is generally 0.6 to 2 millimeters, preferably 2 millimeters. Dimension D the distance from the corner of the ice well to the outermost fingers may be zero or anything greater than zero millimeters.

FIG. 12-14 generally show the ice tray 40 with the heat sinks 60 below each ice well 42. FIG. 12 shows the heat sink 60 further comprising a heat sink base 64 which attaches to the bottom side of the ice well 42. The thickness of the heat sink base 64 may be anywhere from 0.7 millimeters to 4.8 millimeters, preferably 0.7 millimeters. The lower the thickness of the heat sink base 64 allows for greater flexibility of the ice tray 40 during the harvesting process.

The heat sinks may be integrated into the ice tray 40 by overmolding the heat sinks within a plastic ice tray mold. The heat sinks 60 may be placed into a plastic injection mold machine (not shown) and located within the mold. A plastic material in liquid form is then injected around the heat sinks 60 and allowed to cool. This process integrates the heat sinks 60 and the plastic portion of the ice tray 40 as if they were a single part. The heat sink base 64 may mate with the bottom of the ice wells 42, or the heat sink base may be used as the bottom of the ice well 42. In this case, no plastic is injected over the top portion of the heat sink base 64, and allows for more efficient heat exchange between the heat sink 60 and the water within the ice tray 40.

FIG. 13 is a cross section through a center portion of the ice tray 40 with the heat sinks 60 attached. The heat sink base 64 thickness is generally denoted by dimension A and is 0.7 to 4.8 millimeters, preferably 0.7 millimeters. Dimension B is a top surface of the heat sink base 64 which is generally 15.6 by 17.2 millimeters. The heat sink base may also have a side wall that generally conforms to the bottom of the side walls of the ice wells 43. Dimension C is the side wall angle of the heat sink base 64 and is generally 19 degrees to 26 degrees, preferably about 20 degrees. FIG. 14 generally shows the ice well 42 with the heat sink attached and shows a preferred configuration with two cupped walls to allow for a better flexing of the ice tray 40.

As shown in FIGS. 16-19, in the clear ice making process a flexible tray is needed for making and harvesting the ice cubes. An important aspect of the process is to evenly distribute the air across all cubes, which is a 5×2 grid as shown, but may be any configuration. This allows all cubes to freeze at the same rate, front row and back row both get air. Without this piece the air would follow the least resistant path and fall off before traveling to the back row of cubes. Since the tray moves during ice making and is required to rotate more than 160 degrees during harvesting a stationary part is not achievable.

Figure 20:
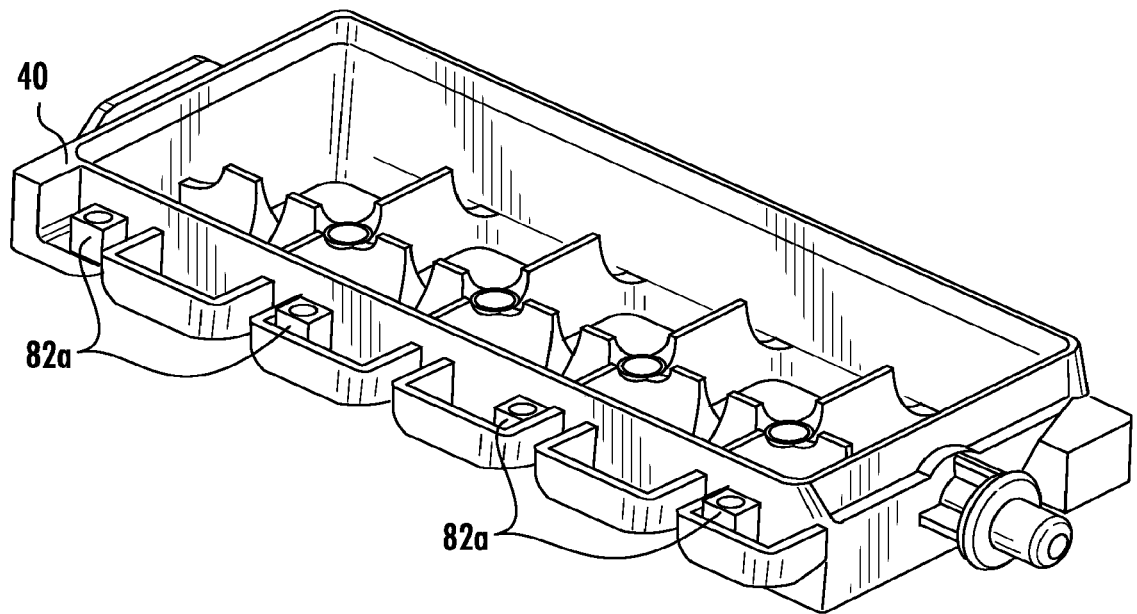
FIG. 20 is an isometric view of an ice tray of an embodiment.
Figure 21:
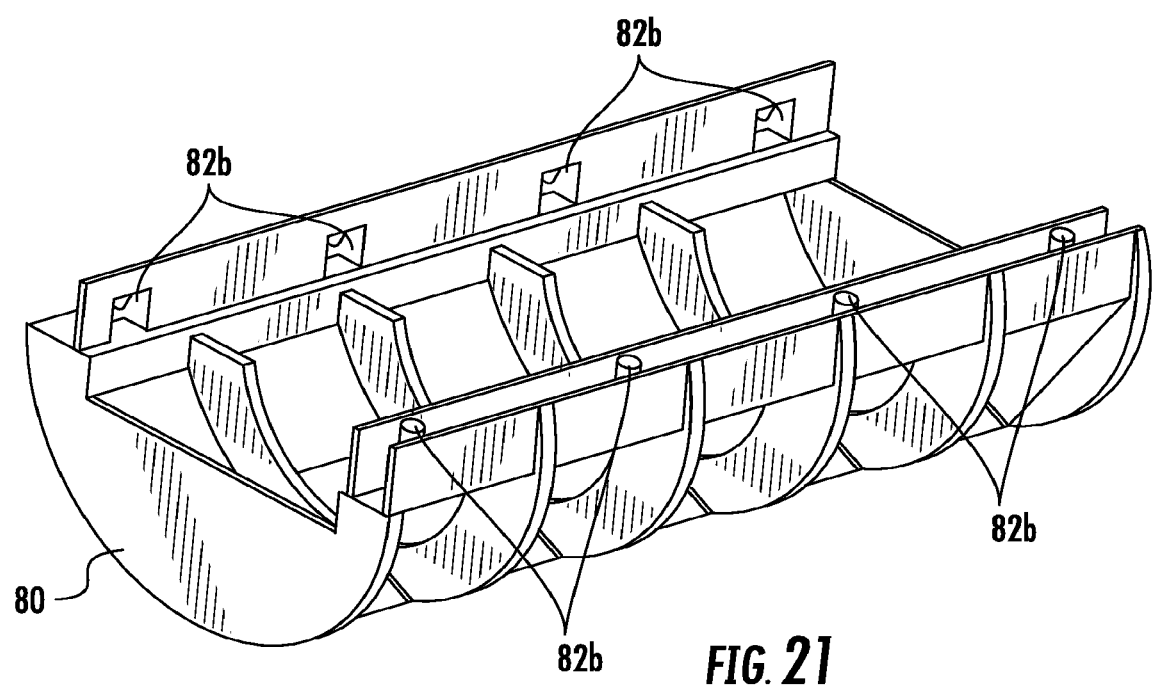
FIG. 21 is an isometric view of a heat sink enclosure.

An air channel 80 as detailed in FIGS. 20-21 may be added to and attached to the bottom of the twist ice tray 40 for maintaining proper airflow across the tray bottom. This channel 80 may be made from a flexible material, such as Santoprene™ or another material known to have flexible properties at low temperatures, such that it does not become rigid in freezing temperatures and flexes without causing added torque from the motor 24 to twist the full tray 40 and air channel 80. The attachment of air channel 80 to twist ice tray 40 may be achieved through attachments 82b on the air channel 80 fit into attachment receivers 82a on the twist ice tray 40. This attachment may also be accomplished by any other form known in the art, such as with fasteners, clips, or the like. The channel 80 captures air from an inlet duct at multiple angles and promotes the airflow to completely travel the base of the ice tray 40. This keeps the ice quality the same for all cubes and helps ensure all cubes freeze at substantially the same time.

Figure 22:
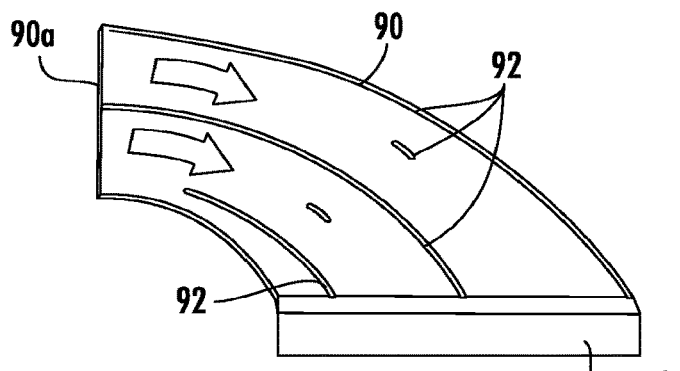
FIG. 22 is a duct connector of an embodiment.
Figure 23:
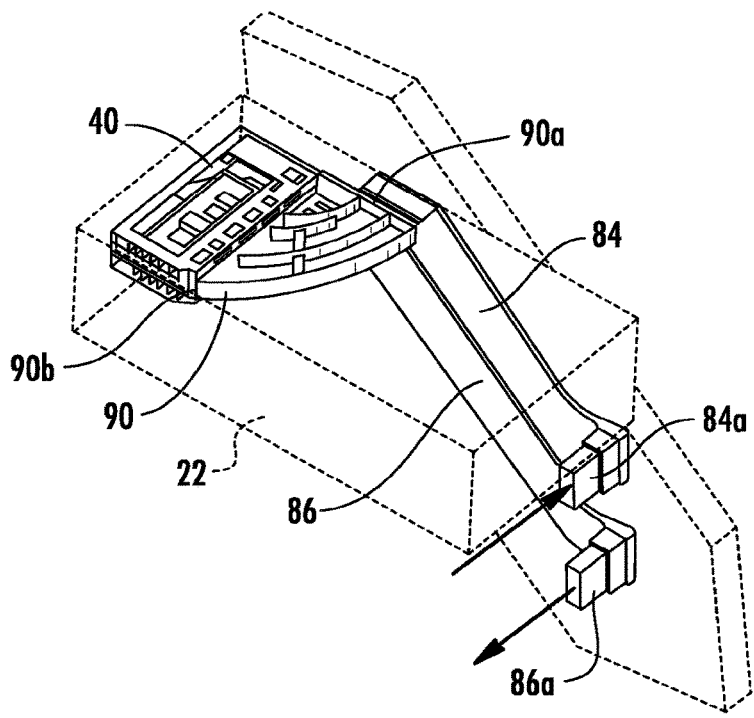
FIG. 23 is a diagram of the duct work of an embodiment.
Figure 24:
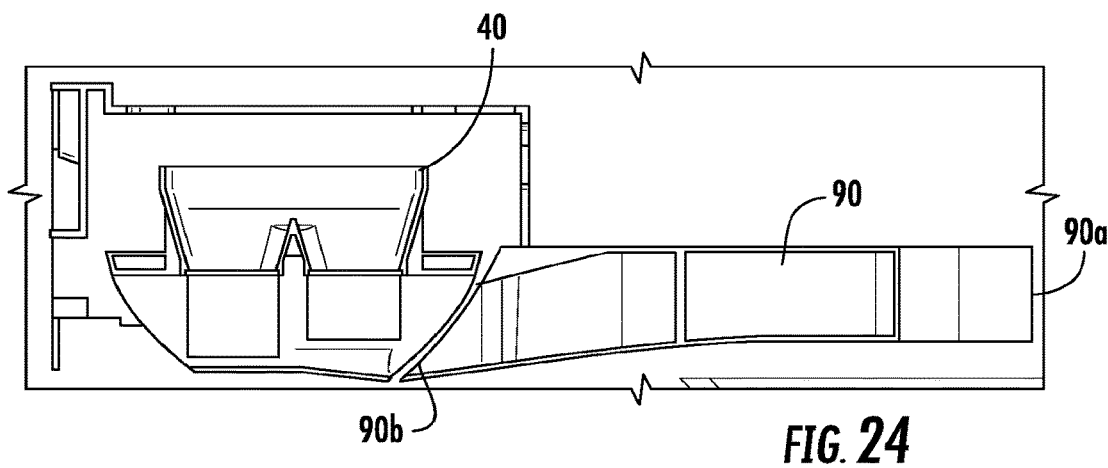
FIG. 24 is a cross section of the duct work of an embodiment.

As shown in FIG. 22-24, clear icemaker requires uniform airflow across the entire width of the icemaker to make sure that each cube is formed in the same time range. FIG. 23 specifically describes an icemaking compartment 22 located in a drawer as shown in FIG. 3A, although the descriptions could apply to other locations within the fresh food compartment as well. Shown is an inlet 84a at a source of cold air, usually a freezer compartment, at one end of an inlet duct 84. The inlet duct terminates at an inlet end 90a of a duct connector 90. The air travels through the duct connector 90, out of the outlet end 90b of duct connector 90 to the ice maker, over or under the ice mold 40 as is desired, and into an outlet duct 86. The outlet duct terminates in an outlet 86a, which may be located back at the source of cold air, or may be located in another location where air warmer than that of the source of cold air may be needed or desired.

The particular geometry of the air duct connector 90 in FIG. 22 may allow the airflow to be uniform across the icemaker. The duct connector 90 may also direct the flow towards the bottom of the icemaker, avoiding the air to go on top of the icemaker. The duct 90 may direct the airflow so it is uniform across the icemaker heat sinks. The duct 90 may also direct the airflow towards the bottom of the ice mold 40 therefore avoiding cold air on top of the icemaker by the inclination of the outlet end 90b of the duct connector 90. The airflow uniformity is facilitated by the design of dividers 92 inside the duct connector 90. The dividers 92 may correct the airflow direction given by the ducts geometry between a fan located in the freezer compartment evaporator (not shown) and the icemaker. This is facilitated by the arcuate design of the dividers 92, which divide the air which is generally constant across the duct as it enters, and directs the air such that it remains generally constant across the duct even as it traverses a bend or corner.

As shown in FIG. 25, to harvest the ice within the ice tray 40 after the water has frozen into ice cubes, the tray 40 is rotated about 150-170, preferably about 160 degrees, such that the distal end 40b of the ice tray 40 from the motor 24 abuts a stop 32. The motor 24 then continues to rotate the proximal end 40a of the tray 40 about another 30 to 50 degrees, preferably about 40 degrees, imparting about a 40 degree twist in the tray. The twist action causes the ice cubes to release from the tray and from each other, and allows them to fall out due to the force of gravity. This saves energy and is more efficient than an ice tray that employs a separate heater or thermoelectric to cause a melt portion of the ice cube to release it from the tray 40.

Figure 27:
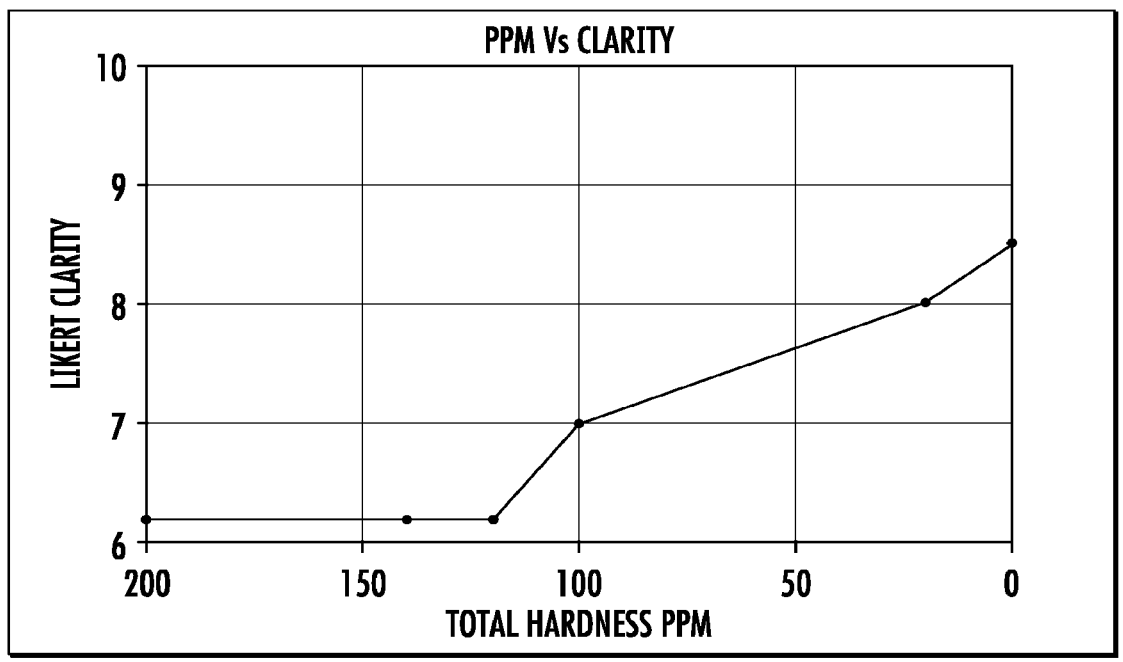
FIG. 27 is a chart showing water hardness (in PPM) vs. the clarity (on the Likert scale).

Shown in FIG. 27 is water hardness (in PPM) vs. the clarity (on the Likert scale) of the ice produced. In order to improve the clarity of the ice produced by the icemaker, it is advantageous to de-ionize the water before it enters the ice tray 40. The refrigerator may have a liquid filter (not shown) disposed in the water line between the household water supply and the water fill tube 50. The filter may be any form known in the art to filter out unwanted particles from a flow of liquid. This filter may be a mineral filter, which removes the ionization that occurs within the water as it traverses water pipes. The hardness of the water is measured in parts per million (PPM). The primary components of water hardness are the ions of calcium (Ca 2+) and Magnesium (Mg 2+). The mineral filter acts to remove a substantial portion of these ions from the water. As can be seen in the graph below, ice cube clarity improves significantly once the water hardness drops below about 100 PPM, and is best at about 0-20 PPM.

Figure 26:
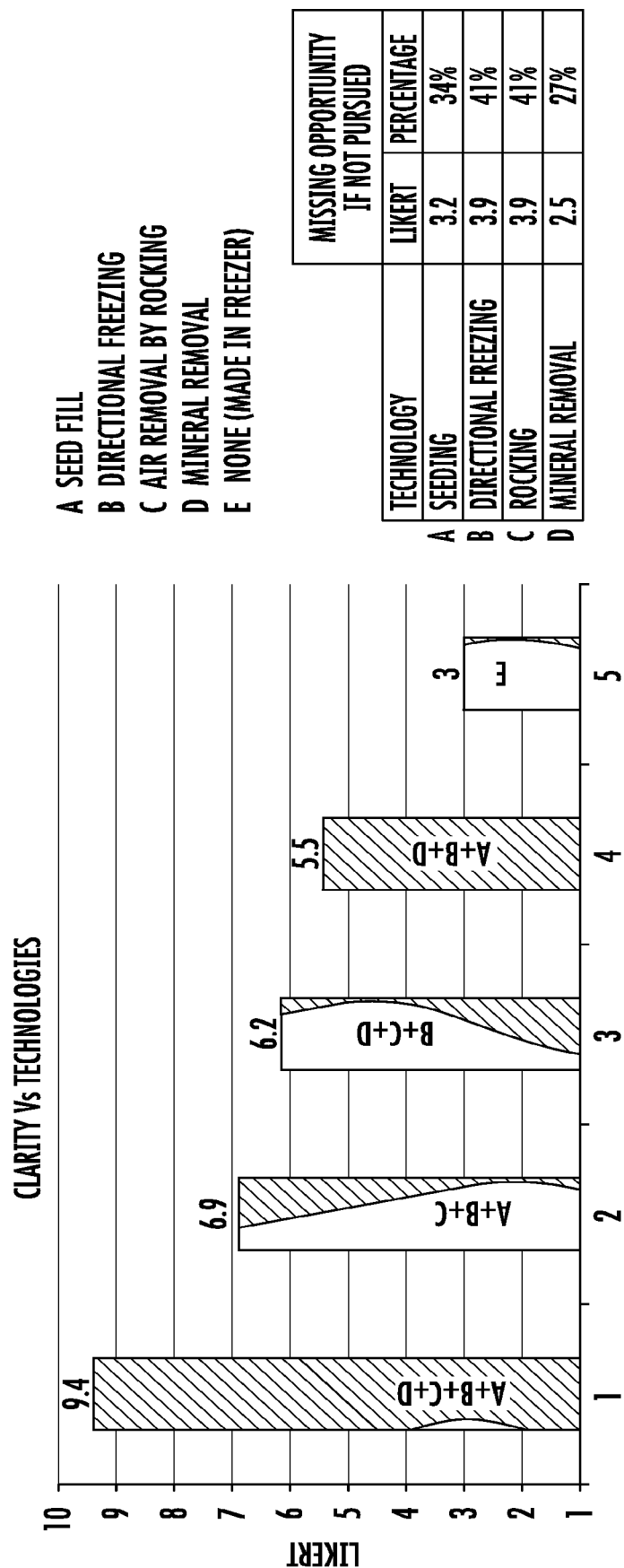
FIG. 26 is a diagram and chart showing clarity benefits.

While all of the methods as described above provide incremental improvements to the clarity of ice, a surprising effect of employing multiple methods is shown in FIG. 26. As shown by the chart, the combination of three of the four listed methods (A, B, C, and D, defined in the Figure) improves the clarity of standard ice cubes by 2.5-3.9 in combination. However, the addition of a single fourth method to any of these combination of three results in an improvement of another 2.5-3.9 on the Likert clarity scale.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of introducing a seed fill into the ice mold of an icemaker comprising the steps of:

providing an icemaker with an ice mold having a perimeter and a plurality of ice wells having a depth configured in at least two rows and at least two columns, wherein the ice mold has a total water capacity;
providing weirs between the at least two rows of ice wells in a generally centered position within the ice well;
providing weirs between the at least two columns of ice wells at least substantially adjacent the perimeter of the ice mold;
introducing an amount of seed fill of water into the ice wells of the ice mold wherein the amount of seed fill of water is substantially less than the total water capacity of the ice mold;
allowing the amount of seed fill of water to freeze;
adding a remaining amount of water into the ice mold; and
directionally freezing the remaining amount of water in the ice mold thereby producing clear ice pieces;
rotating the ice mold clockwise at about 38 to about 42 degrees from horizontal and thereafter pausing for at least about 3 seconds,
rotating the ice mold counter-clockwise at about 38 to about 42 degrees from horizontal and thereafter pausing for at least about 3 seconds;
rotating the ice mold back to a substantially horizontal position; wherein the step of rotating in a counterclockwise direction and the step of rotating in a clockwise direction can be done in either order.

2. The method of claim 1, wherein the ice mold total water capacity is about 100 mL.

3. The method of claim 1, wherein the seed fill is 10-30% of the total water capacity of the ice mold.

4. The method of claim 1, wherein the seed fill is about 20% of the total water capacity of the ice mold.

5. The method of claim 1, wherein the step of introducing a seed fill step is carried out by no more than one fill tube fluidly connected to a household water supply.

6. The method of claim 1, wherein the step of introducing a seed fill step is carried out by a plurality of fill tubes fluidly connected to a household water supply.

7. The method of claim 1, wherein the step of introducing a seed fill step is carried out by a trough with a plurality of apertures to allow water to pass through to the ice mold, wherein the trough is in fluid communication with a fill tube fluidly connected to a household water supply.

8. The method of claim 1, wherein the weirs between the rows and the weirs between the columns are greater than about 50% of the depth of the ice wells.

9. A method of forming substantially clear ice comprising the steps of:
providing an icemaker within a refrigerated appliance, the icemaker comprising:
an ice mold having a full capacity comprising a plurality of ice wells;
a motor operably connected to the ice mold and capable of rotating the ice mold; and
a fill tube fluidly connected to a source of household water;
filling the ice mold with a seed fill of water which is about 20% of the full capacity of the ice mold;
rotating the ice mold clockwise from about 30 degrees to about 50 degrees from horizontal and thereafter pausing for first period of time of at least about 3 seconds;
rotating the ice mold counter-clockwise from about 30 degrees to about 50 degrees from horizontal and thereafter pausing for a second period of time of at least about 3 seconds;
rotating the ice mold back to a substantially horizontal position;
filling the ice mold with water to the full capacity of the ice mold; and
freezing the water in the ice mold.

10. The method of claim 9, wherein the step of rotating the ice mold counterclockwise comprises rotating the ice mold counterclockwise from about 38 degrees to about 42 degrees and the step of rotating the ice mold clockwise comprises rotating the ice mold clockwise from about 38 degrees to about 42 degrees.

11. The method of claim 9, wherein the step of rotating the ice mold counterclockwise comprises rotating the ice mold counterclockwise at least about 40 degrees and the step of rotating the ice mold clockwise comprises rotating the ice mold clockwise at least about 40 degrees.

12. The method of claim 9, further comprising a plurality of fill tubes spaced at different filling zones over the ice mold to promote even filling of the ice mold.

13. The method of claim 9 further comprising the step of blowing air at a temperature lower than the freezing point of water under the ice mold and the step of blowing air warmer than freezing above the ice mold to cause directional freezing of the water within the ice wells.

14. The method of claim 9, further comprising the step of freezing the water directionally from the bottom of the ice well to the top.

* * * * *